United States Patent
Day et al.

(10) Patent No.: US 8,968,956 B2
(45) Date of Patent: Mar. 3, 2015

(54) FUEL CELL REPEAT UNIT AND FUEL CELL STACK

(75) Inventors: Michael J. Day, Lake Orion, MI (US); Scott L. Swartz, Columbus, OH (US); Gene B. Arkenberg, Columbus, OH (US); Chad T. Sellers, Lewis Center, OH (US)

(73) Assignee: NexTech Materials, Ltd, Lewis Center, OH (US)

( * ) Notice: Subject to any disclaimer, the term of this patent is extended or adjusted under 35 U.S.C. 154(b) by 625 days.

(21) Appl. No.: 13/237,902

(22) Filed: Sep. 20, 2011

(65) Prior Publication Data

US 2012/0107714 A1    May 3, 2012

Related U.S. Application Data

(60) Provisional application No. 61/384,545, filed on Sep. 20, 2010.

(51) Int. Cl.
| | |
|---|---|
| *H01M 8/24* | (2006.01) |
| *H01M 8/04* | (2006.01) |
| *H01M 8/10* | (2006.01) |
| *H01M 8/02* | (2006.01) |
| *H01M 8/12* | (2006.01) |

(52) U.S. Cl.
CPC .......... *H01M 8/0276* (2013.01); *H01M 8/0273* (2013.01); *H01M 8/0282* (2013.01); *H01M 8/12* (2013.01); *H01M 2008/1293* (2013.01); *Y02E 60/521* (2013.01); *Y02E 60/525* (2013.01)
USPC ............................ 429/457; 429/479; 429/465

(58) Field of Classification Search
USPC .......................................... 429/457, 479, 465
See application file for complete search history.

(56) References Cited

U.S. PATENT DOCUMENTS

| | | | |
|---|---|---|---|
| 3,553,026 A | | 1/1971 | Winsel |
| 4,002,493 A | * | 1/1977 | Warszawski ................. 429/435 |
| 4,159,367 A | * | 6/1979 | Berchielli et al. ............ 429/469 |
| 4,766,044 A | | 8/1988 | Sederquist |
| 5,173,372 A | | 12/1992 | Matsuo et al. |

(Continued)

FOREIGN PATENT DOCUMENTS

| | | |
|---|---|---|
| DE | 19506690 | 8/1996 |
| DE | 19517042 | 12/1996 |

(Continued)

OTHER PUBLICATIONS

PCT Search Report for PCT/US11/52428, Jan. 18, 2012.

(Continued)

*Primary Examiner* — Karie O'Neill Apicella
(74) *Attorney, Agent, or Firm* — Porter, Wright, Morris & Arthur LLP

(57) ABSTRACT

A repeat unit for a fuel cell stack, the repeat unit having: a conductive interconnect plate; an electrolyte-supported fuel cell, wherein a dense sealing perimeter extends around the entire perimeter of the fuel cell; a cathode gasket adjacent the cathode side of the fuel cell; and an anode gasket adjacent the anode side of the fuel cell. First and second air manifolding ports, and first and second fuel manifolding ports are provided in each of the interconnect plate, dense sealing perimeter of the fuel cell, cathode gasket and anode gasket. An SOFC stack having an aligned stack of a plurality of repeat units is also provided, as well as an SOFC stack configured for cascade fuel flow.

16 Claims, 18 Drawing Sheets

(56) References Cited

U.S. PATENT DOCUMENTS

| | | | |
|---|---|---|---|
| 5,350,642 A | 9/1994 | Akagi | |
| 5,547,777 A | 8/1996 | Richards | |
| 6,040,076 A * | 3/2000 | Reeder | 429/460 |
| 6,106,967 A | 8/2000 | Virkar et al. | |
| 6,251,534 B1 | 6/2001 | McElroy | |
| 6,413,665 B1 | 7/2002 | Blanchet et al. | |
| 6,492,053 B1 | 12/2002 | Donelson et al. | |
| 6,824,910 B2 | 11/2004 | Chung et al. | |
| 7,005,209 B1 | 2/2006 | Gaines et al. | |
| 7,190,568 B2 | 3/2007 | Wood et al. | |
| 7,255,157 B2 | 8/2007 | Richardson | |
| 7,736,787 B2 | 6/2010 | Day et al. | |
| 7,862,950 B2 | 1/2011 | Diaz | |
| 7,892,692 B2 | 2/2011 | Beutel | |
| 7,968,245 B2 | 6/2011 | Gottmann et al. | |
| 8,097,374 B2 | 1/2012 | Gottmann et al. | |
| 8,142,943 B2 | 3/2012 | McElroy et al. | |
| 8,192,888 B2 | 6/2012 | Day et al. | |
| 2003/0087142 A1 * | 5/2003 | Kobayashi et al. | 429/30 |
| 2003/0215689 A1 | 11/2003 | Keegan | |
| 2004/0115503 A1 | 6/2004 | Jacobson et al. | |
| 2004/0151952 A1 | 8/2004 | Brady et al. | |
| 2004/0151975 A1 | 8/2004 | Allen | |
| 2004/0258974 A1 | 12/2004 | Tsuji et al. | |
| 2005/0019645 A1 * | 1/2005 | Thomas et al. | 429/36 |
| 2006/0197264 A1 | 9/2006 | Cutler et al. | |
| 2006/0263664 A1 * | 11/2006 | Fowler et al. | 429/34 |
| 2007/0248855 A1 | 10/2007 | Reinert | |
| 2007/0264556 A1 | 11/2007 | Andreas-Schott et al. | |
| 2008/0248349 A1 * | 10/2008 | McElroy et al. | 429/20 |
| 2008/0286630 A1 | 11/2008 | Jacobson et al. | |
| 2009/0029205 A1 | 1/2009 | Venkataraman et al. | |
| 2009/0148742 A1 | 6/2009 | Day et al. | |
| 2009/0148743 A1 | 6/2009 | Day et al. | |
| 2009/0297904 A1 | 12/2009 | Rozumek et al. | |
| 2010/0167169 A1 | 7/2010 | Day et al. | |
| 2012/0264033 A1 | 10/2012 | Frederiksen et al. | |

FOREIGN PATENT DOCUMENTS

| | | |
|---|---|---|
| DE | 19645111 | 5/1998 |
| DE | 10308382 | 11/2004 |
| EP | 0329161 | 2/1989 |
| JP | 1211868 | 8/1989 |
| JP | 769721 | 3/1995 |

OTHER PUBLICATIONS

English Abstract of DE19645111, May 7, 1998.
English Abstract of DE10308382, Nov. 11, 2004.
English Abstract of DE19506690, Aug. 29, 1996.
English Abstract of DE19517042, Dec. 5, 1996.
English Abstract of JP1211868, Aug. 25, 1989.
English Abstract of JP7069721, Mar. 14, 1995.

* cited by examiner

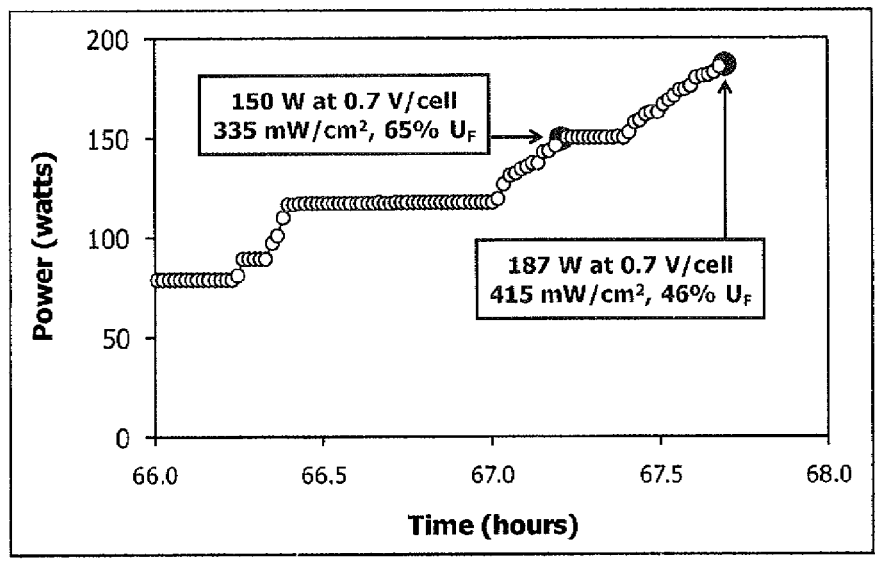
Figure 11. Power obtained in the SOFC stack of Example #75, with air and fuel flows adjusted as stack power increased.
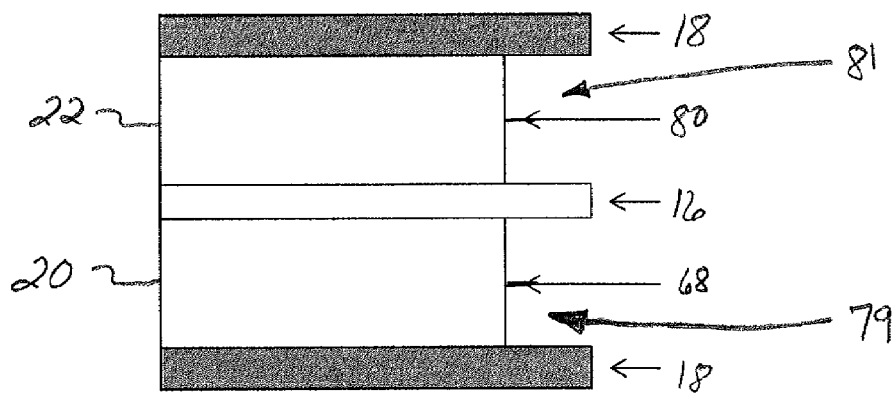
FIG. 12

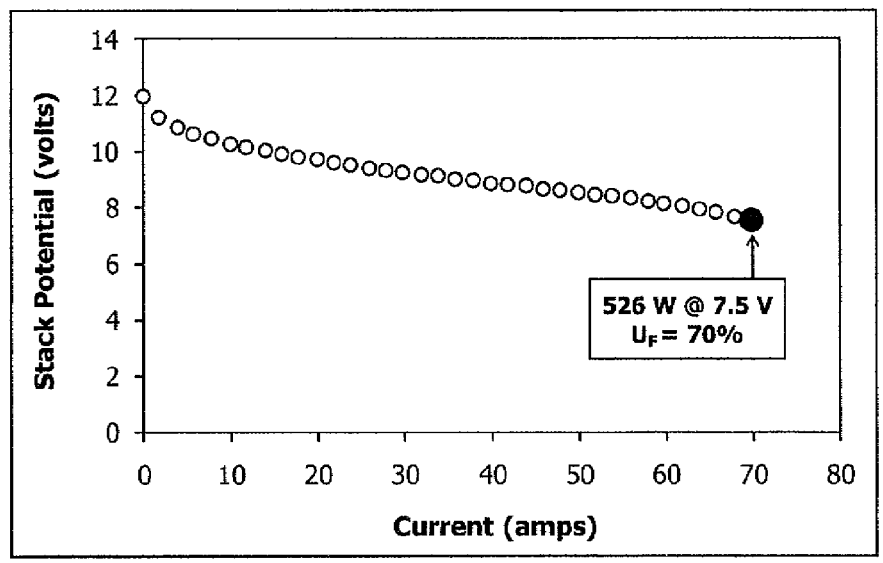
Figure 13. Pole curve data obtained for the SOFC stack of Example #101.
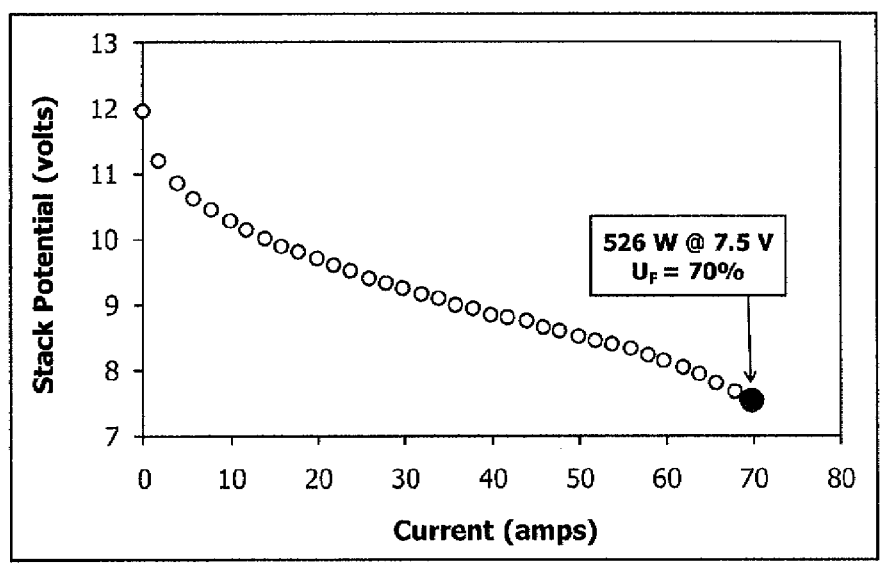
Figure 14. Pole curve data obtained for the SOFC stack of Example #101 (expanded scale).

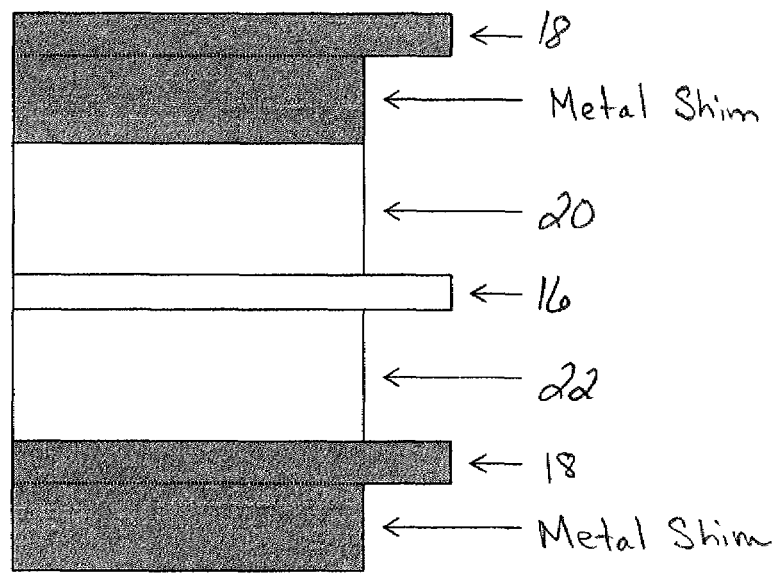
FIG. 15
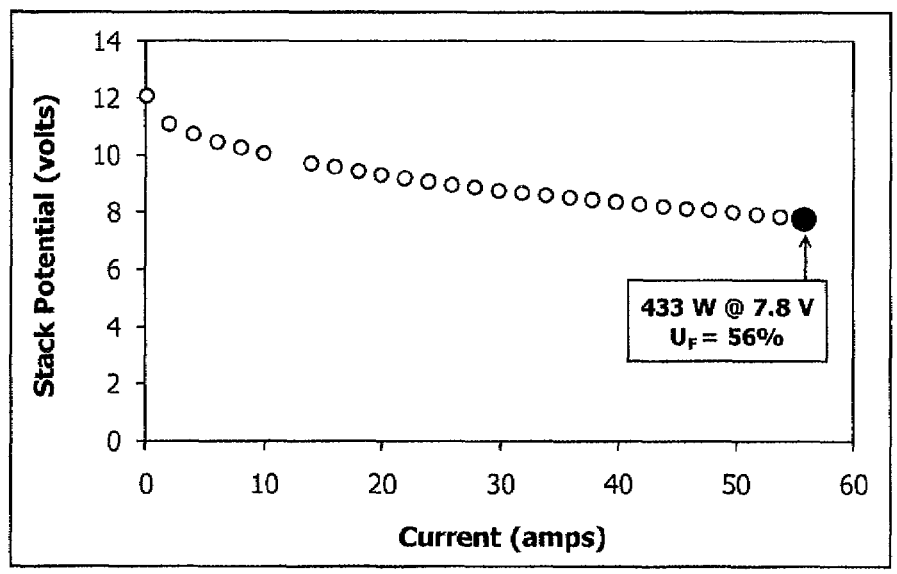
Figure 16. Pole curve data obtained for the SOFC stack of Example #103.

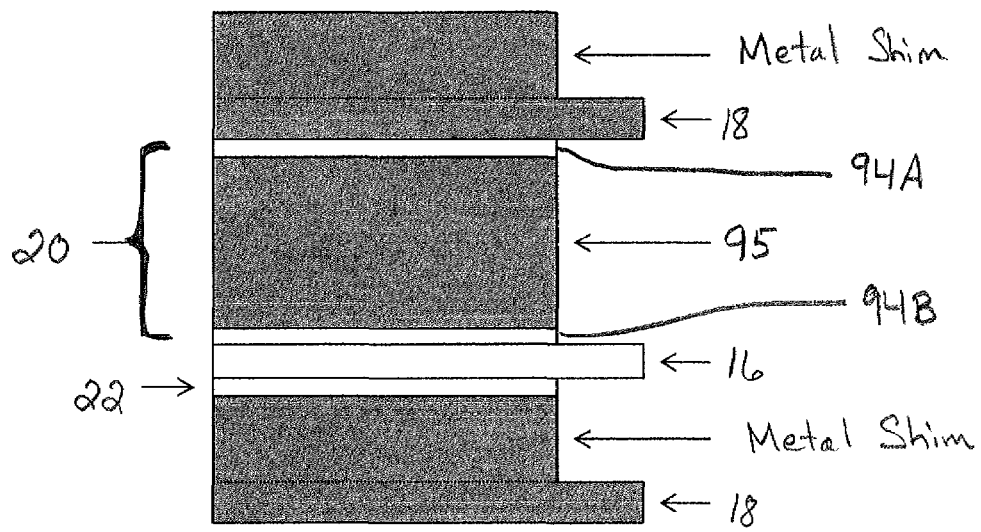
FIG. 17
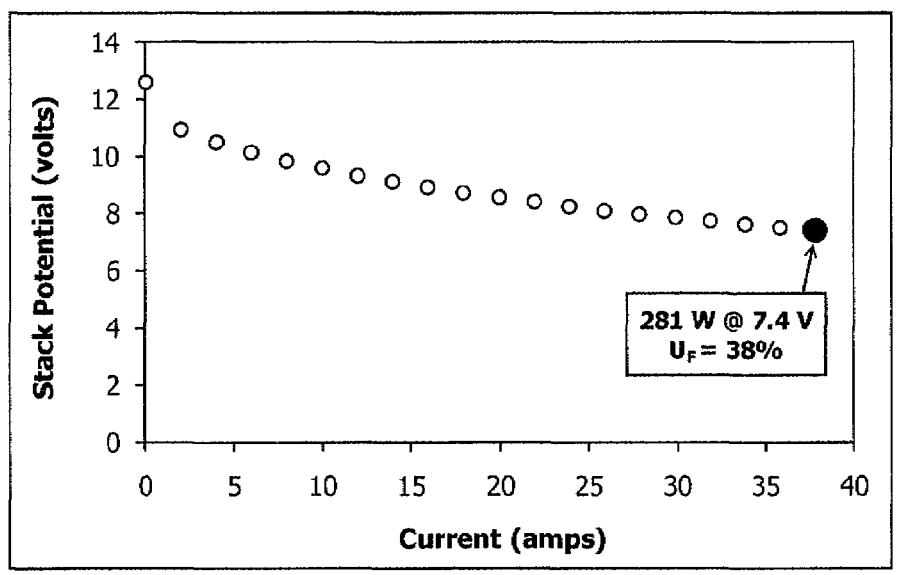
Figure 18. Pole curve data obtained for the SOFC stack of Example #111.

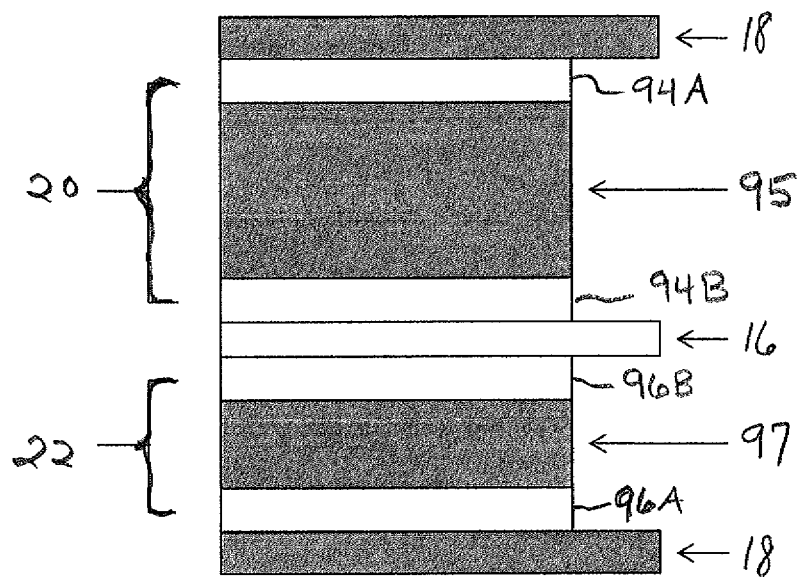
FIG. 19
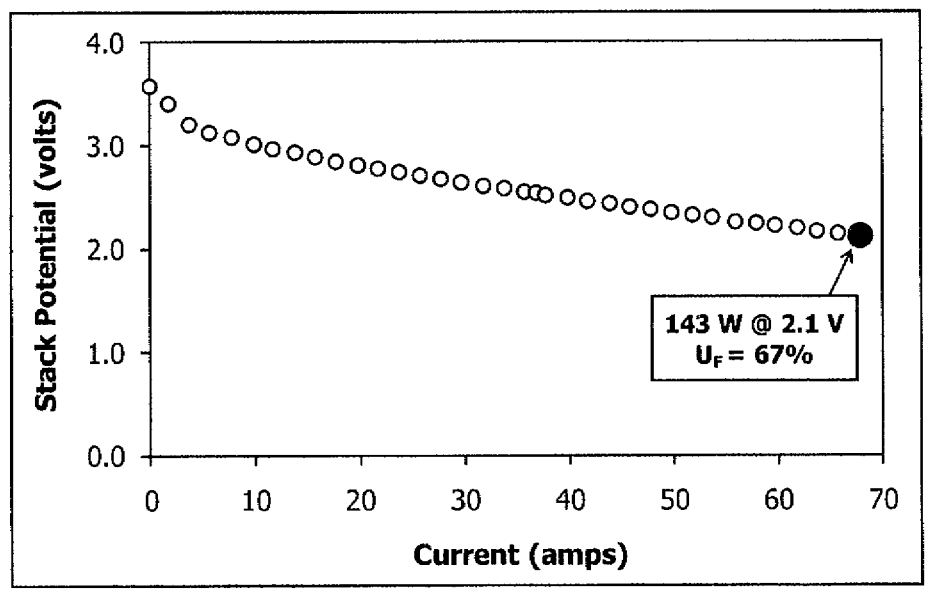
Figure 20. Pole curve data obtained for the SOFC stack of Example #119.

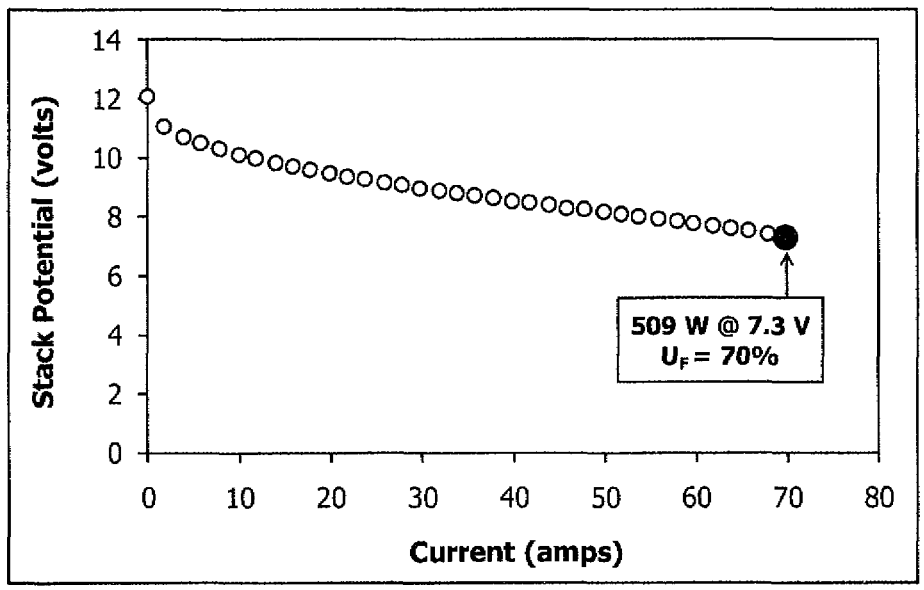
Figure 21. Pole curve data obtained for the SOFC stack of Example #122.
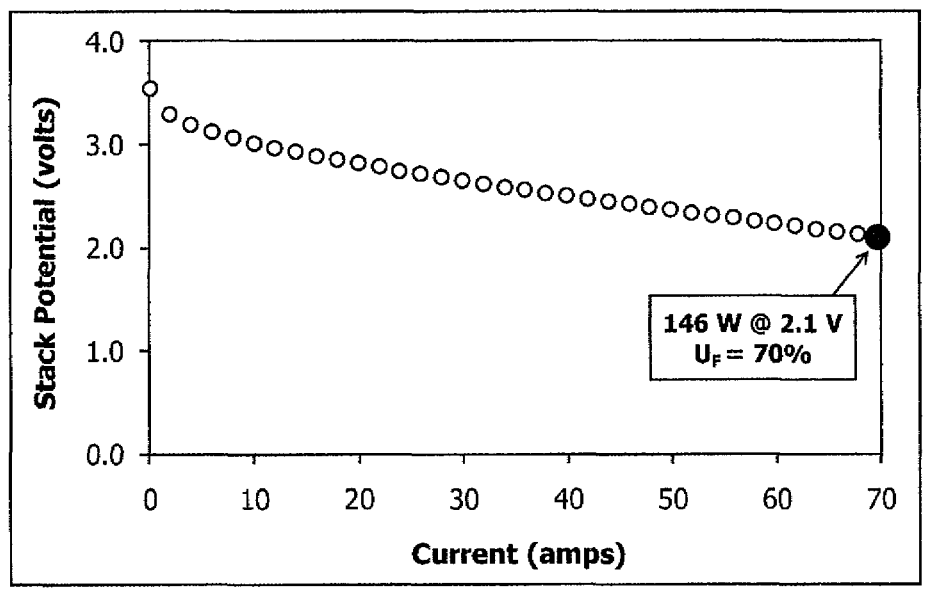
Figure 22. Pole curve data obtained for the SOFC stack of Example #126.

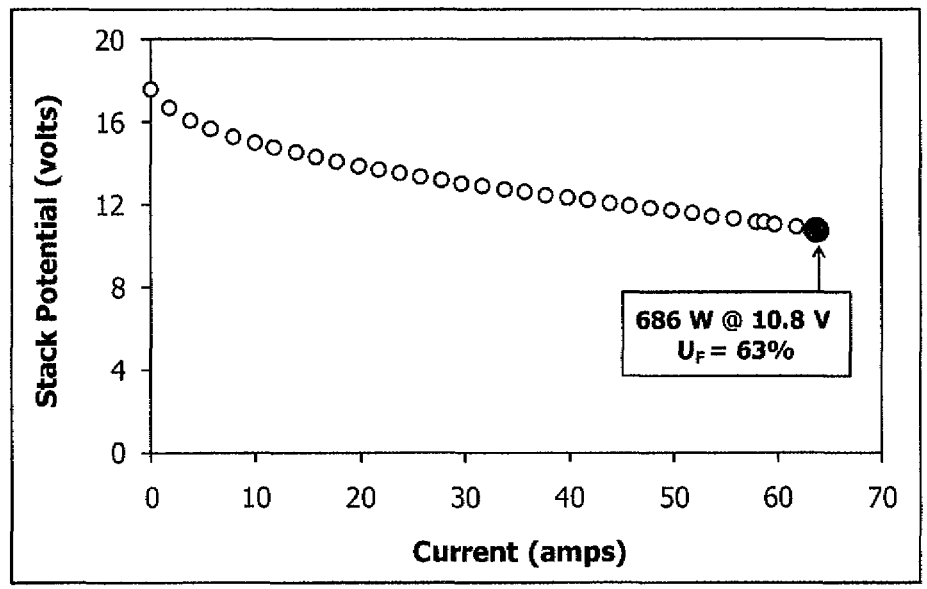
Figure 23. Pole curve data obtained for the SOFC stack of Example #127.
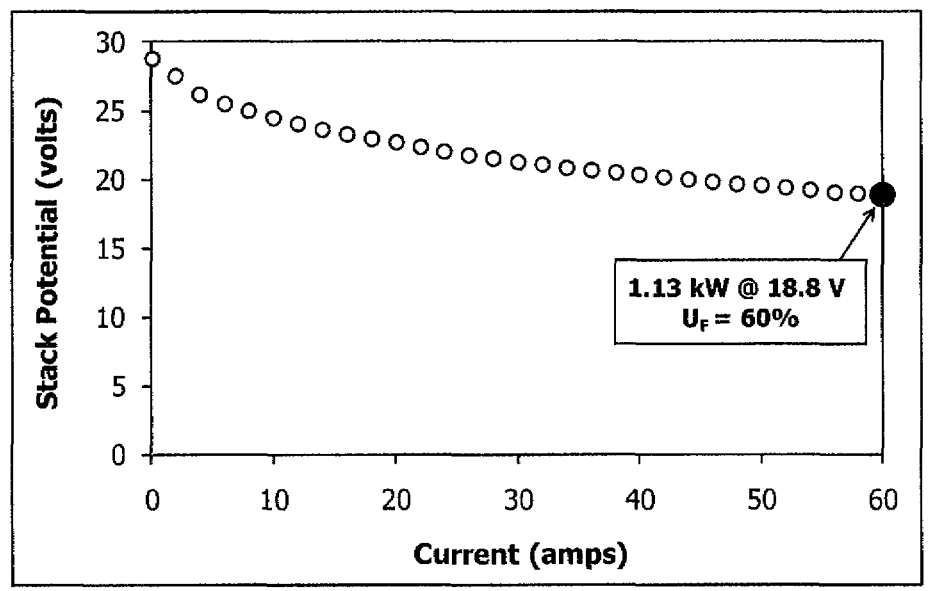
Figure 24. Pole curve data obtained for the SOFC stack of Example #128.

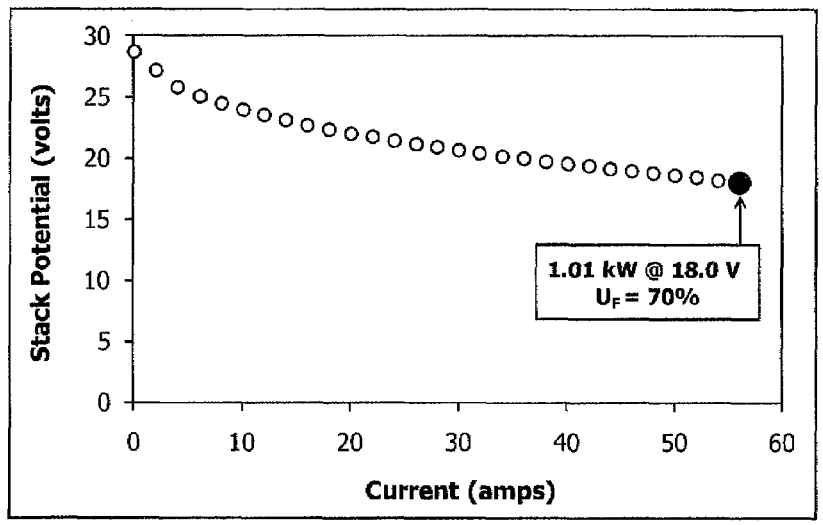
Figure 25. Pole curve data obtained for the SOFC stack of Example #128.
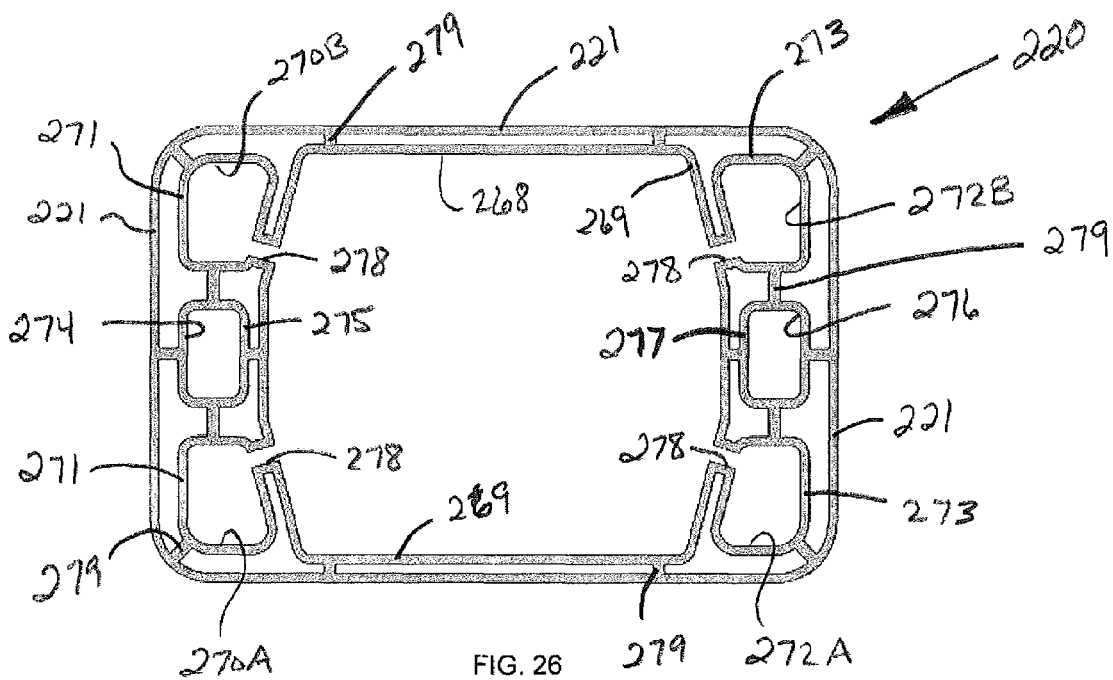
FIG. 26

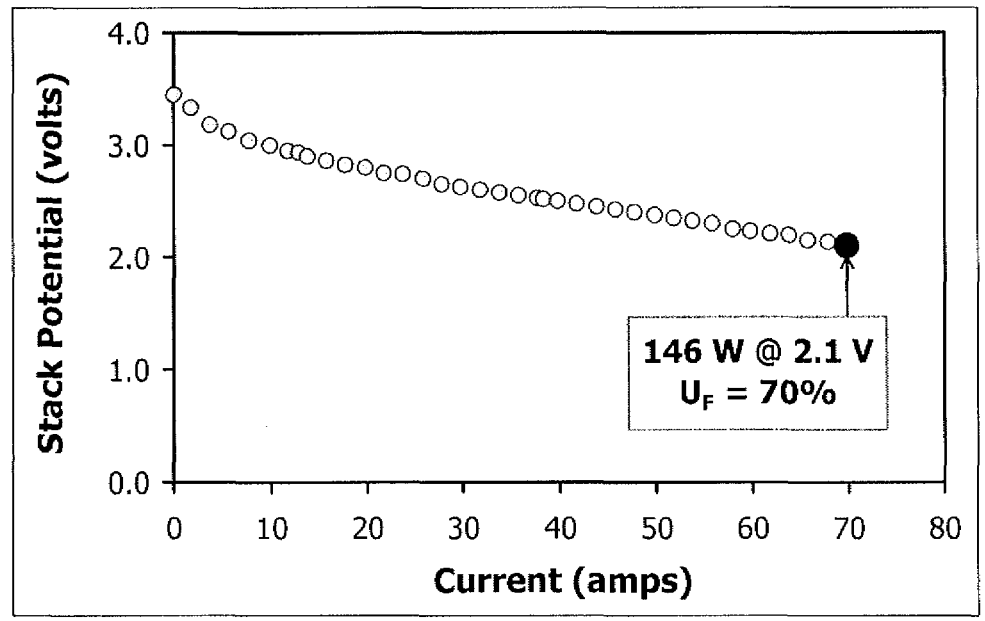
Figure 27. Pole curve data obtained for the SOFC stack of Example #136.
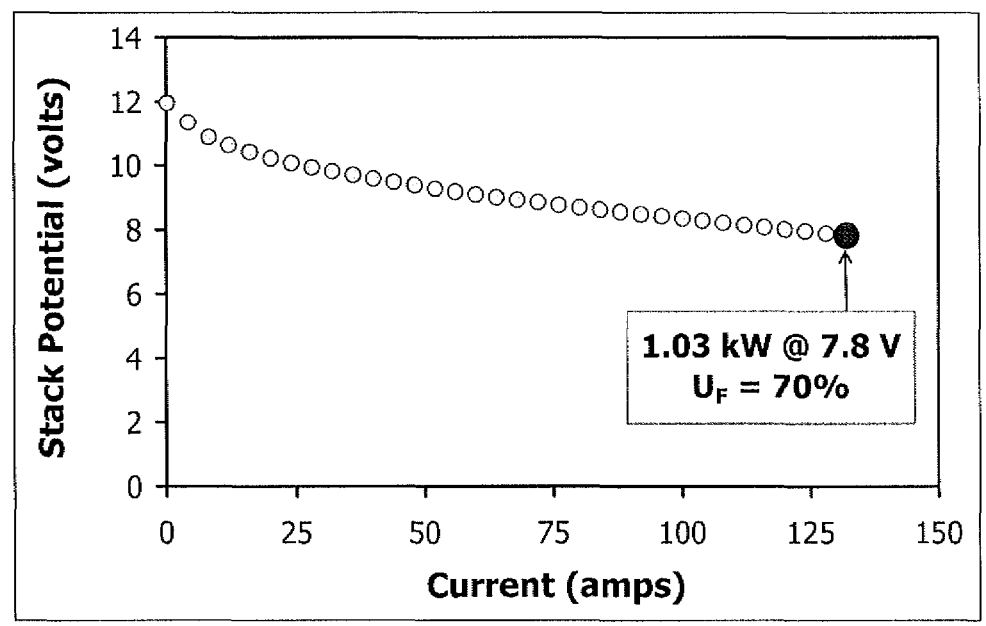
Figure 28. Pole curve data obtained for the SOFC stack of Example #149.

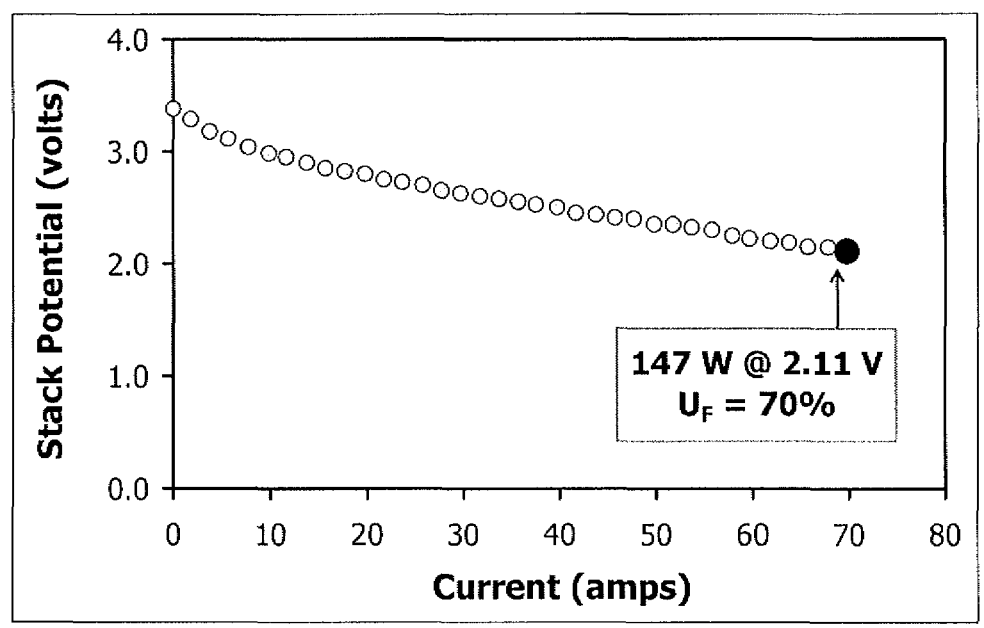
Figure 29. Pole curve data obtained for the SOFC stack of Example #152.

FUEL CELL REPEAT UNIT AND FUEL CELL STACK

CROSS REFERENCE TO RELATED APPLICATIONS

This application claims priority to U.S. Provisional Patent Application No. 61/384,545, filed on Sep. 20, 2010, entitled "Solid Oxide Fuel Cell Stack Design." The disclosure of the foregoing provisional patent application is incorporated by reference herein.

BACKGROUND

Demand for efficient and reliable electrical power is escalating, outpacing improvements in conventional power sources. In addition, concerns about global climate change are increasing with rising the level of $CO_2$ in our atmosphere, caused by the use of combustion-based methods to generate power from fossil fuels. Fuel cells offer a viable approach to increasing efficiency of power generation from fossil fuels, while greatly reducing emissions of greenhouse gases and other pollutants.

Of the various types of fuel cells, the proton exchange membrane (PEM) fuel cell, which operates with hydrogen as a fuel, is receiving considerable attention due to its low weight, low-temperature operation, and ease of manufacture. However, operation of PEM fuel cells with fossil-based hydrocarbon fuels requires extensive pre-processing (reforming) to convert the hydrocarbons into a hydrogen rich gas, and subsequent gas purification steps to reduce carbon monoxide and sulfur to very low levels (CO<10 ppm and $H_2S$<10 ppb).

Solid oxide fuel cells (SOFCs) operate at high temperature (typically, 600 to 1000° C.) and are much less sensitive to impurities in the hydrocarbon fuels, which minimizes the amount of gas purification steps required. This greatly increases power generation efficiency and reduces system complexity. It also is possible to operate SOFCs directly on certain hydrocarbon fuels (e.g., methane, methanol and ethanol) via internal reforming, i.e., without an initial reforming step.

A simplified schematic of a repeat unit of a planar SOFC stack is shown in FIG. 1. As seen in FIG. 1, a solid oxide fuel cell typically comprises an oxygen ion conducting ceramic electrolyte membrane that is sandwiched between a fuel electrode (anode) and an air electrode (cathode). Power is generated by passing air (or oxygen) over the cathode and fuel (e.g., hydrogen plus carbon monoxide) over the anode, with the fuel cell maintained at an elevated temperature (e.g., 600 to 1000° C.). Oxygen reduction occurs at the cathode, and the oxygen ions are conducted through the electrolyte to the anode. At the anode, the oxygen ions oxidize the hydrogen in the fuel, which generates electrical current, along with steam and carbon dioxide. Ceramic electrolyte materials used in SOFCs can include, for example, yttrium-stabilized zirconia (YSZ), scandia-stabilized zirconia (ScSZ), zirconium oxide doped with any combination of rare earth and/or alkaline earth elements, samarium-doped ceria (SDC), gadolinium-doped ceria (GDC), cerium oxide doped with any combination of rare earth and/or alkaline earth elements, lanthanum strontium magnesium gallium oxide (LSGM), and other oxygen-ion-conducting ceramic electrolyte materials known to those skilled in the art. It should be pointed out that the term "air," as used herein, and unless otherwise indicated, is intended to encompass any oxygen-containing gas stream suitable for use with SOFCs, including pure oxygen.

Two of the keys to successful commercial development of SOFC systems are the electrochemical cell design and the "stacking" configuration (i.e., the manner in which the individual fuel cells and related components are configured within a power producing SOFC module or stack of cells). For example, it is often important to pack as large amount of active area for electrochemical reactions as possible within the smallest volume possible. A typical solid oxide fuel cell will generate about 20 to 40 watts of power for every 100 $cm^2$ of active cell area—this translates to more than about 3000 $cm^2$ of active area for a kilowatt of power.

Planar SOFCs have been demonstrated extensively. Typically, the fuel cell (anode/electrolyte/cathode layers) is mechanically supported by the anode, requiring that the anode layer be the thickest of the three. In other designs, the fuel cell is supported by the electrolyte layer, which typically necessitates a thick electrolyte layer which can impede performance.

Recently, novel fuel cells incorporating self-supporting electrolyte membranes have been developed by NexTech Materials, Ltd. (Lewis Center, Ohio) which overcome some of the technical barriers associated with building SOFC stacks with conventional planar cells. Some of these electrolyte membrane and fuel cell designs are described, for example, in published patent application US 2006/0234100 A1, published on Oct. 19, 2006, titled "Self-Supporting Ceramic Membranes and Electrochemical Cells and Cell Stacks Including the Same," and in U.S. Pat. No. 7,736,787 B2, issued Jun. 15, 2010, titled "Ceramic Membranes With Integral Seals and Support, and Electrochemical Cells and Electrochemical Cell Stacks Including the Same." The aforementioned published patent application and issued patent are each incorporated by reference herein.

In one such design marketed by NexTech Materials as the FlexCell™ fuel cell, the electrolyte membrane includes a thin electrolyte layer that is mechanically supported by a "honeycomb" mesh layer of electrolyte material (as further described in U.S. Pub. No. 2006/0234100). In the FlexCell™ fuel cell design, more than 75 percent of the electrolyte membrane within the active area may be thin (20 to 40 microns), and the periphery of the cell is dense. Electrode (anode and cathode) layers are subsequently deposited onto the major faces within the active cell regions to complete the fabrication of the SOFC. As used herein, the term "dense" means that there is substantially no interconnected porosity and substantially no gas permeability.

An alternative design marketed by NexTech Materials is the HybridCell™ fuel cell. While the self-supporting electrolyte membrane includes a thin electrolyte layer that is mechanically supported by a "honeycomb" mesh layer of electrolyte material (as further described in U.S. Pat. No. 7,736,787), the anode layer (e.g., 30 to 40 microns thick) is co-sintered between the mesh support layer and the thin electrolyte membrane layer. The cathode layer is deposited on an outer surface of the electrolyte membrane within the active cell region, such as on the outer surface of the thin electrolyte layer. In the HybridCell™ fuel cell, the entire active cell area has a thin electrolyte membrane layer (e.g., 10 to 20 microns thick), and the periphery of the cell is dense.

Further details regarding the FlexCell™ and HybridCell™ fuel cell designs, as well as other forms of electrolyte-supported fuel cells and various ways of providing anode and cathode layers on such fuel cells, are described in U.S. published patent applications 2009/0148742 A1 and 2009/0148743 A1, both of which were published on Jun. 11, 2009, and are titled "High Performance Multilayer Electrodes for Use in Reducing Atmospheres." These two published applications are also incorporated by reference herein.

In order to generate useful amounts of electrical power, planar SOFCs are usually configured in a "stack", with multiple planar fuel cells separated by planar electrical interconnect components (also referred to as "interconnects") that conduct electricity between the cells. Typically, and as shown in FIG. 1, the interconnects also define the flow paths for oxidant (air or oxygen) through the cathode channels and fuel ($H_2$, CO, $CH_4$, etc.) through the anode channels.

Many planar stack designs also include conductive foams or meshes within the stack to facilitate current collection. For example, a cathode current collector is sometimes positioned between, and in electrical contact with, the interconnect and the cathode face of the planar SOFC cell, and an anode current collector is positioned between, and in electrical contact with, the interconnect and the anode face of the planar SOFC cell. It is also important to provide gas-tight seals between the anode and cathode chambers of the stack for efficient fuel cell operation.

While a variety of SOFC stack designs and components may exist, it is believed that no one prior to the inventors has made or used an invention as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings. In the drawings, like numerals represent like elements throughout the several views.

FIG. 11 is a plot depicting the results of Example #75 herein.

FIG. 12 is a cross-sectional view similar to FIG. 2C, depicting the sealing arrangement used in Example #101 herein (it will be noted that the current collectors are not depicted in this view).

FIG. 13 is a plot depicting the results of Example #101 herein.

FIG. 14 is the same plot as in FIG. 13, with an expanded scale for stack potential.

FIG. 15 is a cross-sectional view similar to FIG. 12, but depicting the sealing arrangement used in Example #103 herein.

FIG. 16 is a plot depicting the results of Example #103 herein.

FIG. 17 is a cross-sectional view similar to FIG. 12, but depicting the sealing arrangement used in Example #111 herein.

FIG. 18 is a plot depicting the results of Example #111 herein.

FIG. 19 is a cross-sectional view similar to FIG. 12, but depicting the sealing arrangement used in Example #s 119, 122, 126, 127, 128, 136, 149 and 152 herein.

FIG. 20 is a plot depicting the results of Example #119 herein.

FIG. 21 is a plot depicting the results of Example #122 herein.

FIG. 22 is a plot depicting the results of Example #126 herein.

FIG. 23 is a plot depicting the results of Example #127 herein.

FIG. 24 is a plot depicting the results of Example #128 herein.

FIG. 25 is a plot depicting further results of Example #128 herein.

FIG. 26 is a top plan view of an alternative embodiment of a cathode seal gasket for use in the repeat unit of FIG. 2.

FIG. 27 is a plot depicting the results of Example #136 herein.

FIG. 28 is a plot depicting the results of Example #149 herein.

FIG. 29 is a plot depicting further results of Example #152 herein.

Figure 1:
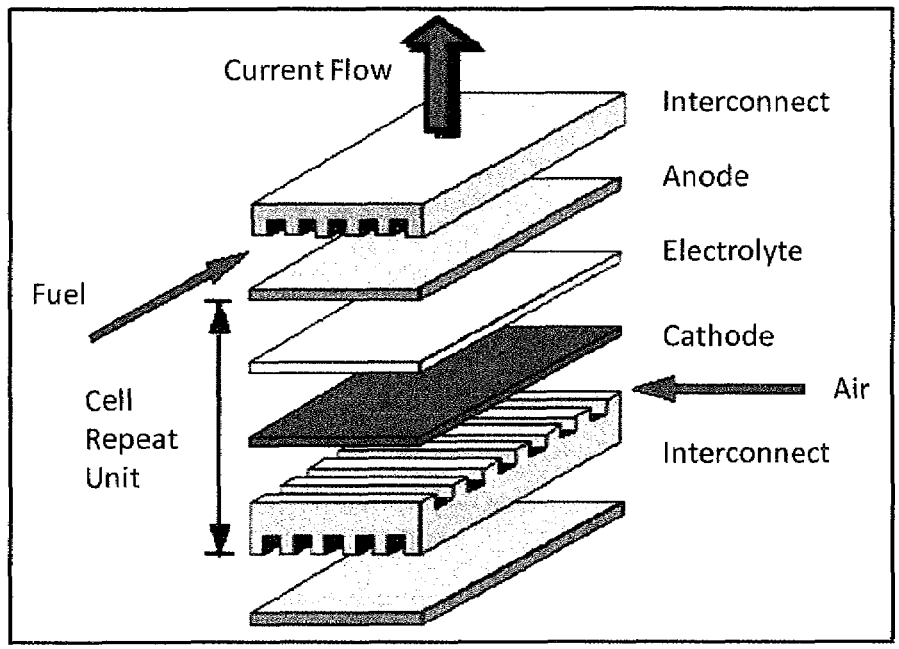
FIG. 1 depicts a schematic exploded view of a repeat unit of a conventional planar SOFC stack.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples should not be used to limit the scope of the present invention. Other features, aspects, and advantages of the versions disclosed herein will become apparent to those skilled in the art from the following description. As will be realized, the versions described herein are capable of other different and obvious aspects, all without departing from the invention. Accordingly, the drawings and descriptions should be regarded as illustrative in nature and not restrictive.

Described herein are planar SOFC stack designs, particularly the repeat unit thereof, some features of which are particularly suited to some of the unique attributes of electrolyte-supported fuel cells (e.g., the FlexCell™ and HybridCell™ fuel cells described above and further herein). In some embodiments, electrolyte-supported fuel cells which are flexible and have a dense cell periphery for sealing are advantageously employed. This allows, for example, the ability to maximize the size of the active area in any given footprint. In some embodiments, not only is the dense fuel cell periphery used for sealing purposes, but gas manifolding ports (air and fuel) are provided in the fuel cell periphery—namely, in the dense sealing perimeter comprising the electrolyte membrane of the fuel cell. While specific embodiments shown and described herein employ the FlexCell™ fuel cell, such as described for example in U.S. Pub. No. 2006/0234100, it will be understood that the HybridCell™ fuel cell design, such as further described in U.S. Pat. No. 7,736,787, may be used instead (or in combination therewith). Alternatively, the repeat units and stack designs and materials described herein may be used with any electrolyte-supported solid oxide fuel cell.

Some aspects of the repeat units for a fuel stack, as further described herein, include: a conductive interconnect plate; an electrolyte-supported fuel cell comprising an electrolyte membrane, an anode on one side of the membrane, and a cathode on the opposite side of the membrane, wherein a dense sealing perimeter extends around the entire perimeter of the fuel cell; a cathode gasket adjacent the cathode side of the fuel cell, sealingly engaged between the dense sealing perimeter of the fuel cell and the interconnect, the cathode gasket having a central opening therein which is aligned with, and extends about, the cathode of the fuel cell; and an anode gasket adjacent the anode side of the fuel cell, sealingly engageable between the dense sealing perimeter of the fuel cell and an interconnect of another repeat unit, the anode gasket having a central opening therein which is aligned with, and extends about, the anode of the fuel cell. The first and second air manifolding ports, and first and second fuel manifolding ports are provided in each of the interconnect plate, dense sealing perimeter of the fuel cell, cathode gasket and anode gasket components, with each of these ports on the components aligned with corresponding ports on the other components such that the aligned ports together provide at least first and second air plenums and at least first and second fuel plenums. In addition, at least one passageway extends between each of the air ports of the cathode gasket and the central opening of the cathode gasket so as to provide fluid communication between the air ports and the central opening of the cathode gasket. Similarly, at least one passageway extends between each of the fuel ports of the anode gasket and the central opening of the anode gasket so as to provide fluid communication between the fuel ports and the central opening of the anode gasket. In some embodiments, each of the interconnect, fuel cell, and gasket components have the same footprint (i.e., perimeter size and shape) in order to facilitate alignment during assembly (although it will be understood that each of these components will typically have different thicknesses).

Anode and cathode current collectors may also be provided, such as within the central openings of the anode and cathode seal gaskets. The current collectors provided electrical contact between the fuel cell electrodes and the adjacent interconnects. The anode and cathode gaskets may be provided in any of a variety of configurations, such as a layered structure of an interior metal shim layer, located between outer electrically-insulating layers (e.g., glass or glass-ceramic composites).

Figure 2:
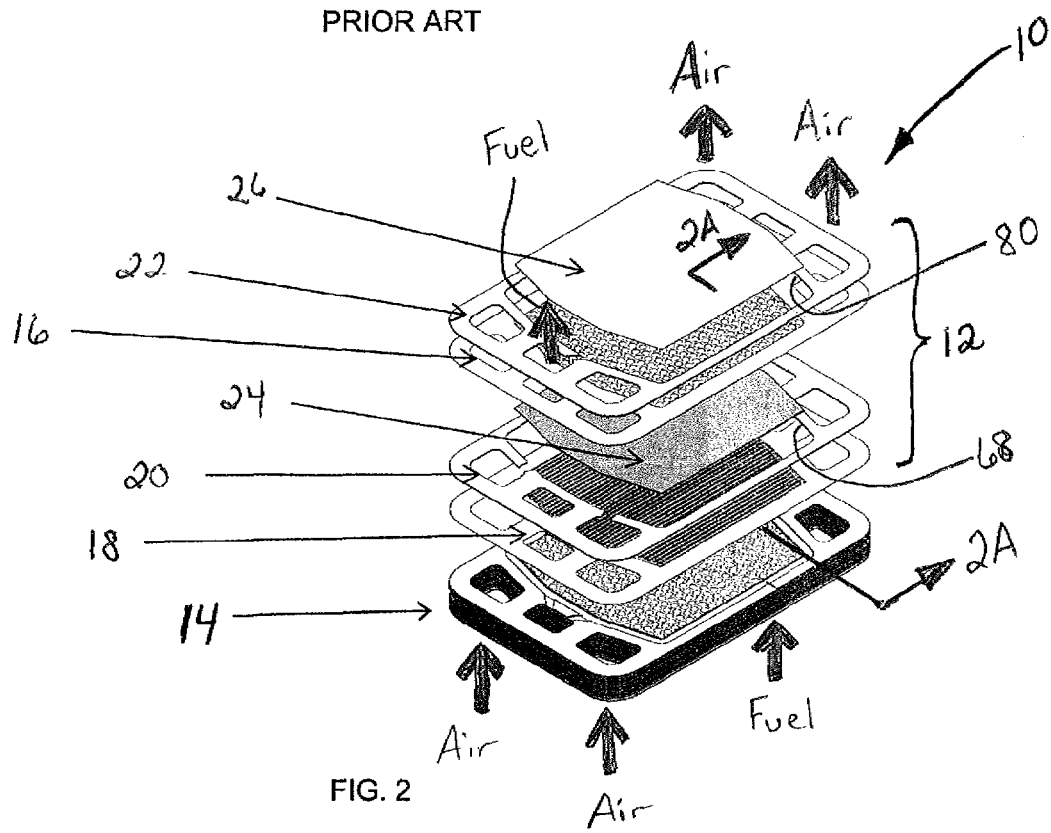
FIG. 2 depicts a schematic exploded view of an SOFC stack repeat unit, along with a stack of assembled repeat units therebeneath.

One embodiment of an SOFC fuel cell stack (10) is depicted in FIG. 2. The fuel cell stack (10) of FIG. 2 comprises a plurality of repeat units (12) which are stacked on top of each other to provide a stack of desired size. One repeat unit (12) is shown schematically in exploded view, above a set (14) of stacked repeat units (12). Each repeat unit (12) generally includes a fuel cell (16) (anode/electrolyte/cathode), an interconnect plate (18), a first seal gasket (20) positioned between bottom surface of fuel cell (16) and interconnect plate (18), and a second seal gasket (22) positioned over the top surface of fuel cell (16). In the particular embodiment shown in FIG. 2, first and second current collectors (22, 24) are also provided, with first current collector (22) positioned over the electrode on the top surface of fuel cell (16), and second current collector (24) positioned beneath the electrode on the bottom surface of fuel cell (16). For the sake of clarity, the electrode on the top surface of fuel cell (16) will be defined as the anode, and the electrode on the bottom surface of fuel cell (16) will be defined as the cathode, as further described herein. Of course, this orientation may be reversed in all of the repeat units (12) of stack (10).

Figures 3A, 4:
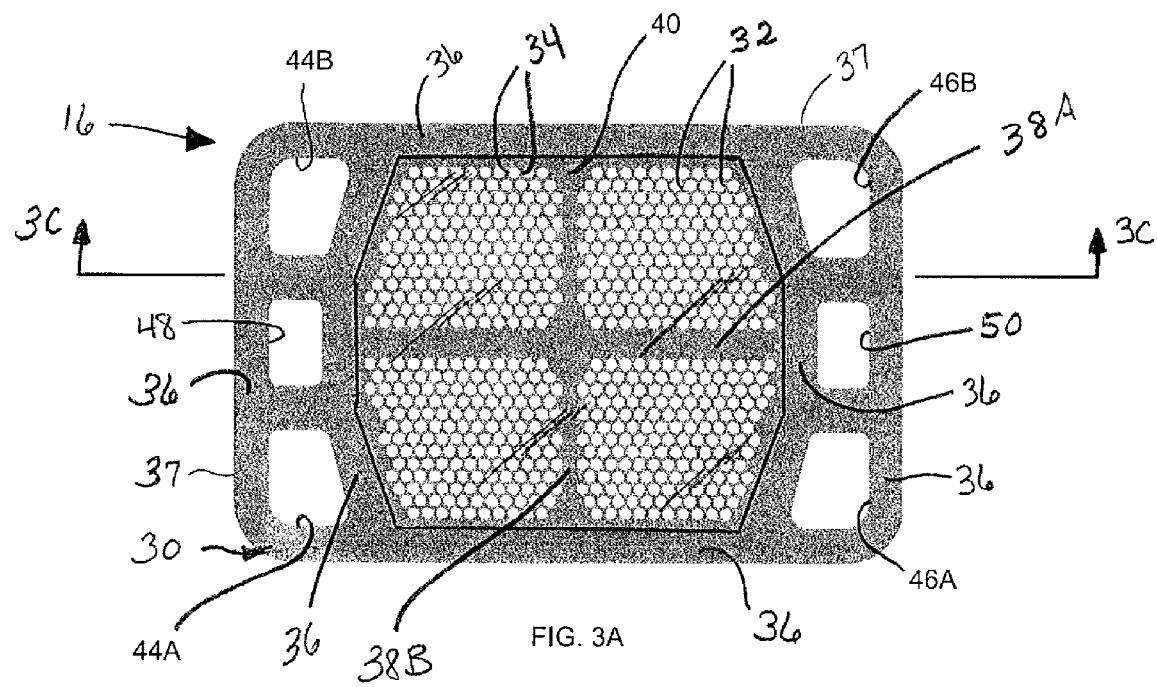
FIG. 3A is a top plan view of a modified version of the fuel cell component of the repeat unit of FIG. 2.
FIG. 4 is a top plan view of an interconnect of the repeat unit of FIG. 2.
Figure 3B:
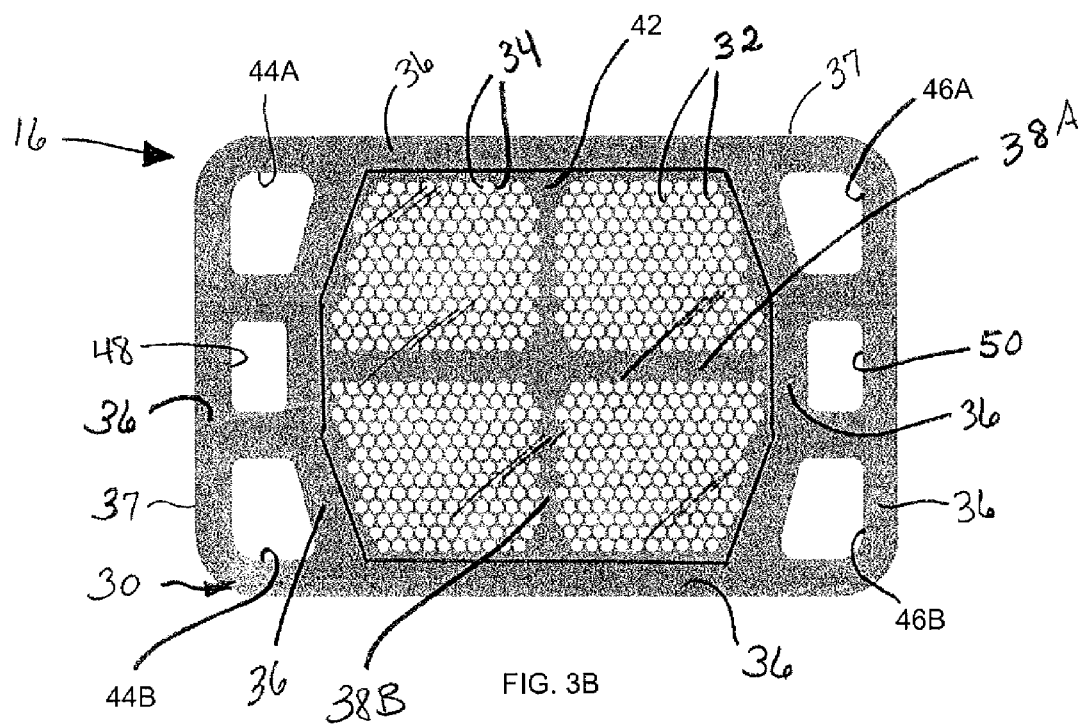
FIG. 3B is a bottom plan view of the fuel cell of FIG. 3A.
Figure 3C:
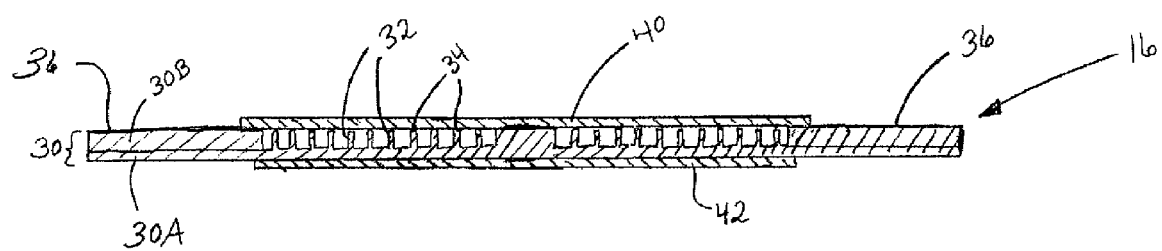
FIG. 3C is a cross sectional view of the of the fuel cell of FIG. 3A, taken along the line 3C-3C thereof.

As best seen in the top and bottom plan views of FIGS. 3A and 3B, respectively, and the cross-sectional view of FIG. 3C, fuel cell (16) includes an electrolyte membrane (30), an anode layer (40) on a portion of the upper surface of electrolyte (30), and a cathode layer (42) on a portion of the lower surface of electrolyte (30). The area of fuel cell (16) bounded by both anode (40) and cathode (42) is the active area of the fuel cell (16). It should be pointed out that the thicknesses depicted in FIG. 3C are exaggerated for purposes of clarity. The configuration and construction of fuel cell (16) is further described in U.S. Pub. Nos. 2006/0234100 A1, 2009/0148742 A1 and 2009/0148743 A1.

Electrolyte membrane (30) has a central mesh-like region having a plurality of hexagonal voids (32) separated by a plurality of interconnected support ribs (34). Of course any of a variety of shapes may be used in place of hexagons, such as circular, square, octagon-shaped voids. Voids (32) do not extend through the full thickness of electrolyte membrane (30). Rather, voids (32) extend through the thickness of support layer (or portion) (30B), but not through thin layer (or portion) (30A) of membrane (30) (see FIG. 3C). In this manner, support ribs (34) provide mechanical support while hexagonal voids (32) expose thin layer (30A) therethrough. This construction provides the benefits of a thin electrolyte membrane, while also providing sufficient mechanical support in the active area. As further described herein, in the specific example described herein, the area of electrolyte membrane (30) having hexagonal voids (32) and the active area of the cell generally have corresponding octagonal shapes in order to provide more uniform fuel flow across the anode side of fuel cell (16). Of course the active area and the region having the voids (32) may have any of a variety of other shapes and configurations, such as hexagonal (by eliminating the straight sections on either end) or rectangular. In addition, the portions of interconnect (18) having gas flow channels (if any), as well as the central openings in the seal gaskets and the current collectors may have shapes matching the shape of the active area of the fuel cell (16).

It should also be pointed out that the embodiment of fuel cell (16) shown in FIG. 3 differs slightly from that depicted in FIG. 2. In particular, although the region having voids (32) in FIG. 3 has an overall octagonal shape, void-free central segments (38A, 38B) extend centrally across the length and width of electrolyte membrane (30). This provides a full-thickness, dense cross-shaped central support region which divides the active area into four sub-areas, as shown in FIG. 3. This central support region, which comprises the combined thickness of thin layer (30A) and support layer (30B), provides additional support in the center of the active area of the cell (16). Depending on the size (particularly the active area), material and thickness of fuel cell (16), the central support region provided by intersecting segments (38A, 38B) may not be needed or may be configured in any of a variety of shapes, sizes and orientations.

Any of a variety of electrolyte materials and compositions may be used for electrolyte membrane (30), and each of the support and thin layers (or portions) (30A, 30B) may be the same or different. Also, each of these layers (30A, 30B) may be formed from two or more sheets, as described in U.S. Pub. No. 2006/0234100 A1. Exemplary materials for electrolyte membrane (30) include, for example, yttria stabilized zirconia, scandia stabilized zirconia, lanthanum strontium gallium magnesium oxide, or rare earth or alkaline earth doped cerium oxide. Layers (30A, 30B) may also be provided in a variety of thicknesses. By way of example, support layer (30A) may be 50 to 500 microns thick, or even 200 to 400 microns thick. Thin layer (30B) is thinner than support layer (30A), and may be may be 5 to 100 microns thick, or even 20 to 60 microns thick.

The active area (i.e., the area bounded by the anode and cathode, may be at least about 20% of the surface area of fuel cell (16) (as defined by its outer perimeter), or even at least about 45% of the surface area. Within the active area, at least about 20% of the active area may be thin (i.e., the portion of the active area having voids (32)), or even at least about 35%.

As best seen in FIG. 3C, anode layer (40) is provided on the upper surface of support layer (30B) of electrolyte membrane (30), and cathode layer (42) is provided on the lower surface of thin layer (30A) of electrolyte membrane (30). Anode and cathode layers (40, 42) have octagonal shapes similar to the area of support layer (30B) having voids (32). Anode and cathode layers (40, 42) are sized and shaped to extend beyond the outer perimeter of the void-containing area of membrane (30), but not to the lateral side edges of membrane (30) or to the gas ports (described below). In the example shown, anode layer (40) and cathode layer (42) are the same size and shape. In alternative embodiments, the anode and cathode layers may be configured differently.

Any of a variety of materials may be used for anode and cathode layers (40, 42). Suitable materials for anode layer (40) include, for example, mixtures of nickel oxide and/or cobalt oxide with yttria stabilized zirconia, scandia stabilized zirconia, and/or rare earth or alkaline earth doped cerium oxide. Suitable materials for cathode layer (42) include, for example, lanthanum strontium manganite, lanthanum strontium zinc ferrite, lanthanum strontium cobalt ferrite, lanthanum strontium ferrite and composites of these materials with yttria stabilized zirconia, scandia stabilized zirconia and doped cerium oxide. Each of the anode and cathode layers (40, 42) may also be provided in a variety of thicknesses, and may even be applied as multiple sheets or layers. By way of example, anode layer may be 5 to 75 microns thick, or even 20 to 60 microns thick. Cathode layer may be 5 to 75 microns thick, or even 25 to 60 microns thick. By way of further example, anode layer (40) may be deposited onto electrolyte membrane (30) according to the teachings of U.S. Pub. No. 2009/0148742 A1, and cathode layer (42) may be deposited onto the electrolyte membrane (30) according to the teachings of U.S. Pub. No. 2009/0148743 A1.

In the example shown, fuel cell (16) has a generally rectangular shape. It will be understood that other shapes may be used in the various SOFC stack designs and assemblies described herein. As shown in FIG. 2, fuel cell (16) has the same rectangular footprint as interconnect (18), and seal gaskets (20, 22). Because electrolyte membrane (30) of fuel cell (16) includes a dense perimeter region (36) having the combined thickness of support layer (30B) and thin layer (30A), dense perimeter (36) is used for sealing purposes in repeat unit (12). This sealing isolates the anode and cathode sides of fuel cell (16) from each other, thus preventing leakage of fuel or air into the wrong side of the fuel cell. Fuel is distributed only to the anode side, and air is distributed only to the cathode side. Leakage from the SOFC stack (10) is also prevented.

Dense perimeter region (36) extends about the entire perimeter of fuel cell (16), from the outer peripheral edge (37) of membrane (30) to the active area of the cell (16), except where interrupted by the gas manifolding ports which extend through the thickness of perimeter region (36). Sealing perimeter (36) also extends around the gas manifolding ports, as shown. Thus, in the embodiment shown in FIG. 2, a separate mounting frame for positioning and retaining the fuel cell in the stack assembly is not required, and both fuel and air flow through the electrolyte membrane for distribution throughout the stack (as further described below). In the example shown, dense perimeter region (36) may have a width (i.e., in the top of bottom plan views of FIGS. 3A and 3B) of about 1-30 mm in order to provide adequate sealing. In other embodiments, the dense perimeter region (36) may have a width of about 2-15 mm. This width may also be relatively constant throughout the fuel cell (16), as shown, or may vary as desired.

As mentioned previously, fuel and air are provided to opposite sides of the fuel cells of an SOFC stack. Fuel is typically flowed across the anode side through the anode chamber located between the anode and interconnect, and air is flowed across the cathode side through the cathode chamber located between the cathode and interconnect. In a planar SOFC stack, the flow directions of air passing through the cathode gas channel(s) and fuel through the anode channel(s) is one of several parameters which influences various performance measures. In cross-flow stack designs such as that shown in FIG. 1, air and fuel are flowed in perpendicular directions (e.g., one flows across the length of the fuel cell, and the other flows across the width). In co-flow and counter-flow stack designs, the air and fuel are flowed in the same or opposite (but parallel) directions, respectively. It is generally known that cross-flow stack designs often result in significant thermal gradients within an operating stack, especially when the stack is based on planar cells with relatively large active areas. In the embodiment shown in FIG. 2, stack (10) is configured for operating in either co-flow or counter-flow configurations. The repeat unit (12) of SOFC stack (10) of FIG. 2 provides internal manifolding of air and fuel in either co flow or counter-flow configurations. The gas ports provided in each layer of the repeat unit provide the air and fuel plenums for distribution of air and fuel throughout the stack (10). For purposes of description and for the examples provided later herein, fuel and air flows in FIG. 2 are depicted as a counter-flow arrangement. However, the same repeat unit may be used in a co-flow arrangement. It should be understood, that many of the features and structures described herein can be applied to cross-flow stack designs.

As shown in FIG. 2, fuel cell (16) has the same rectangular footprint as interconnect (18), and seal gaskets (20, 22). Furthermore, each of these components has a total of six gas manifolding ports, each of which extend through the full thickness of the component. In each instance, three of the ports are arrayed across the width of the component adjacent one end, and the other three ports are arrayed across the width of the component adjacent the opposite end. It will be understood, however, that this arrangement is merely exemplary of one possible configuration. When repeat unit (12) is assembled, the corresponding ports on fuel cell (16), interconnect (18), and seal gaskets (20, 22) are aligned with one another so as to define six gas flow paths which extend from the bottom to the top of the SOFC stack (10). As further described herein, passageways are provided in certain of the gas ports in seal gaskets (20, 22) for allowing fuel or air to flow therethrough to the anode or cathode side of the fuel cell (16), as appropriate. In other words, features on the seal gaskets (20, 22) direct gas flows to the fuel cell (16), while gas simply flows unimpeded and undiverted through the gas manifolding ports provided in fuel cell (16) and interconnect (18).

Figure 9:
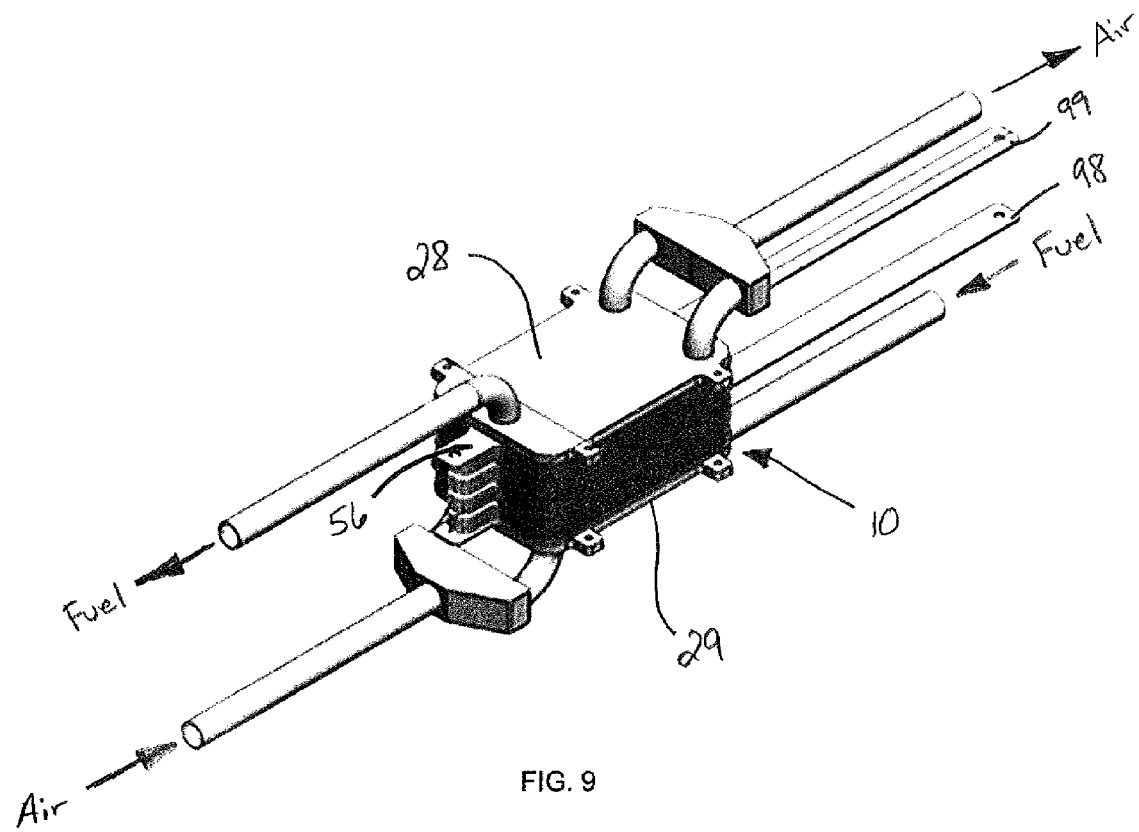
FIG. 9 is a schematic illustration of an assembled SOFC stack positioned between upper and lower manifold plates, and attached air and fuel supply and return lines conduits operatively connected thereto.

As shown schematically in FIG. 2, SOFC stack (10) is configured for parallel flow of air and fuel (co-flow or counter-flow), with counter-flow specifically depicted in FIGS. 2 and 9. (FIG. 9 simply depicts SOFC stack (10) between upper and lower manifold plates (28, 29), along with air and fuel supply and return lines operatively connected thereto.) Thus, air and fuel enter at the bottom of stack (10), at opposite ends of the stack, and both exit at the top of stack (10) at an end opposite the end where they entered the stack. Three gas paths extend upwardly through stack (10) at each end (for a total of six gas paths)—two paths at the corners of opposite ends of the stack for air, and a single path in the middle of each end of the stack for fuel. Two paths are provided along each end of the stack for the cathode air in this example because air flows are typically much larger than fuel flows during SOFC operation. As described below, the gas flow paths are provided by aligned ports provided in the layers of each repeat unit.

Air enters the two outer paths at one end of the stack, as shown, and flows upwardly through the paths in the stack (provided by aligned ports in each layer), as well as across the cathode side of each fuel cell (16). Fuel enters the central flow path at the opposite end of the stack, and flows upwardly through the path in the stack (provided by aligned ports in each layer), as well as across the anode side of each fuel cell (16). Thus, air and fuel flow in opposite directions along the length of the fuel cells (16), as well as upwardly through the stack. In some embodiments, this approach provides higher fuel utilization, and thus improved electrical power generation efficiency as compared to a cross-flow arrangement such as in FIG. 1. For other applications, a co-flow arrangement may be more desirable or appropriate.

With reference to FIGS. 3A and 3B, a first pair of air manifolding ports (44A, 44B) are provided in dense perimeter (36) of electrolyte membrane (30) at the corners of one end of fuel cell (16), and a second pair of air manifolding ports (46A, 46B) are provided in dense perimeter (36) of electrolyte membrane (30) at the corners of the opposite end of fuel cell (16). When arranged in the manner shown in FIGS. 2 and 9, oxygen-rich air flows upwardly through ports (44A, 44B), and oxygen-depleted air (i.e., air which has traveled across the cathode side of a fuel cell) flows upwardly through ports (46A, 46B). First fuel manifolding port (48) is provided in dense perimeter (36) of electrolyte membrane (30) between air ports (44A, 44B), and second fuel manifolding port (50) is provided in dense perimeter (36) of electrolyte membrane (30) between air ports (46A, 46B) at the opposite end of fuel cell (16). When arranged in the counter-flow orientation shown in FIGS. 2 and 9, fresh (unreacted) fuel flows upwardly through second port (50), and depleted fuel (i.e., fuel which has traveled across the anode side of an underlying fuel cell) flows upwardly through first port (48). As discussed below, ports of corresponding shape and location are provided in interconnect (18) and seal gaskets (20, 22) such that air and fuel flow paths extend through the stack (10).

Air and fuel ports (44, 46, 48, 50) may be provided in any number, shape, orientation and location. For example, while air ports (44, 46) have a right trapezoidal cross-sectional shape in order to maximize the volume of the air plenum within the stack (i.e., maximize the use of areas outside of the active area of the fuel cell (16)), air ports (44, 46) may be configured to have a rectangular shape similar to fuel ports (48, 50). Alternatively, any of a variety of other shapes and sizes may be used for the fuel and air ports in fuel cell (16) and in the other components of the repeat unit (12) such as circular or oval shapes. In addition, multiple fuel ports may be provided at each end of fuel cell (16), as well as a single, or more than two, air ports at each end.

FIG. 4 is a top plan view of interconnect (18). Interconnect (18) has a rectangular footprint which corresponds to that of fuel cell (16). It should be noted that interconnect (18) depicted in FIG. 4 differs slightly from that shown in FIG. 2 in that several voltage monitor tabs (56) extend away from three of the four sides of interconnect (18). Tabs (56) may be used to monitor voltage of the stack during operation or to provide attachments for extracting current from SOFC stack (10). Any number of tabs (56) may be provided on each interconnect (18), in any of a variety of locations. Depending on stack configuration, one or more of the tabs (56) in one or more interconnects (18) may be removed, depending on the requirements of a particular SOFC stack. In addition, tabs (56), particularly the tabs provided along opposite ends of interconnect (18) in an offset arrangement, may be used to guide and align stack assembly or even for purposes of alignment when stamping flow channels into interconnect (18).

Like fuel cell (16), interconnect (18) includes six gas manifolding ports which, when repeat unit (12) is assembled, align with the six corresponding gas ports of fuel cell (16). A first pair of air manifolding ports (58A, 58B) are provided at the corners of one end of interconnect (18), and a second pair of air manifolding ports (60A, 60B) are at the corners of the opposite end of interconnect (18). When arranged in the manner shown in FIGS. 2 and 9, oxygen-rich air flows upwardly through ports (58A, 58B), and oxygen-depleted air (i.e., air which has traveled across the cathode side of a fuel cell) flows upwardly through ports (60A, 60B). First fuel manifolding port (62) is provided between air ports (58A, 58B), and second fuel manifolding port (64) is provided between air ports (60A, 60B) at the opposite end of fuel cell (16). When arranged in the manner shown in FIGS. 2 and 9, fresh (unreacted) fuel flows upwardly through second port (64), and depleted fuel (i.e., fuel which has traveled across the anode side of an underlying fuel cell) flows upwardly through first port (62).

Interconnect (18) can be made of any of a variety of conductive, dense materials, such as various ceramics or metals known to those skilled in the art. Metallic alloys often provide a less-expensive choice. By way of example, chromium-containing ferritic alloys may be used, such as Crofer 22 APU (offered by Theissen Krupp), AL441-HP (offered by Allegheny Ludlum), and ZMG232L (offered by Hitachi Metal). These and any other metallic alloys known to those skilled in the art can be used in the repeat units and stack designs described herein.

One or both surfaces of interconnect (18) may be cut, stamped or otherwise fabricated to provide gas flow channels such as that depicted in FIG. 1. Gas flow channels in the upper surface of interconnect (18) allow air to flow across the cathode of the fuel cell, and thus provide all or part of the cathode chamber through which air is flowed. Gas flow channels in the lower surface of interconnect (18) allow fuel to flow across the anode of the fuel cell, and thus provide all or part of the anode chamber through which fuel is flowed.

In the embodiment shown in FIG. 4, interconnect (18) is formed from a relatively thin metallic foil which has been cut to the shape shown in FIG. 4. Interconnect (18) has also been stamped so as to form gas flow channels (66) in the upper and lower surfaces of interconnect (18), in a region corresponding to the active area of the fuel cell when the repeat unit is assembled. Since interconnect (18) comprises a thin foil, stamping will form gas flow channels in both the upper and lower surfaces of interconnect (18)—the flow channels in the upper surface for directing air flow across the cathode side of fuel cell (16), and the flow channels in the lower (or anode-facing side) for directing fuel flow across the anode side of fuel cell (16). In alternative embodiments, gas flow channels may be provided on only one of the interconnect surfaces. As yet another alternative, both surfaces of interconnect (18) may be flat (i.e., no gas flow channels).

As noted in FIG. 4, gas flow channels (66) comprise a series of grooves which extend lengthwise across the upper and lower surfaces of the interconnect (18), in the direction of air and fuel flow across the cathode and anode sides, respectively, of the fuel cell. These channels (66) not only direct air and fuel flow, they also allow for increased air and fuel flow across the cathode and anode sides of the cell. As also noted in FIG. 4, the air channels (66) are arranged in an octagonal shape corresponding to the active area of fuel cell (16). However, the area of interconnect (18) having air (or fuel) channels formed therein may comprise any of a variety of shapes corresponding to alternative active area shapes and/or for providing various gas flow patterns, as desired.

Interconnect (18) may be provided in a variety of thicknesses. However, in some embodiments, particularly those employing gasket seals (20, 22) for defining the anode and cathode chambers, interconnect (18) may be thin, with gas channels (e.g., channels (66)) formed therein by inexpensive stamping rather than cutting or machining. For example, interconnect (18) may be between about 50 and 1000 microns thick, or even between about 100 and about 500 microns thick. And when gas channels are formed in one or both surfaces of interconnect (18), the gas channels may be between about 50 and 500 microns deep, or even between about 100 and about 300 microns deep. The size and depth of the gas flow channels may be controlled, for example, by the stamping depth. In general, the area of interconnect (18) having gas flow channels formed therein may correspond in size, shape and location to that of the active area of fuel cell (16).

In order to direct gas flow across the anode and cathode sides of the fuel cell, passageways may be cut (or otherwise formed) in the gas manifolding ports of interconnect (18) to allow air and fuel to flow across the cathode and anode sides of the fuel cell, respectively. Such passageways will allow air to flow into the cathode chamber defined between the cathode side of fuel cell (16) and the interconnect therebeneath, and fuel to flow into the anode chamber defined between the anode side of fuel cell (16) and the interconnect thereabove. Such passageways may be located as described below for the gas passageways in sealing gaskets (20, 22), with the anode and cathode chambers defined by the space between gas channels in interconnect (18) and the anode and cathode layers.

In the embodiments shown in the drawings herein, however, the gas manifolding ports (58, 60, 62, 64) of interconnect (18) are uninterrupted, such that air and fuel simply flow upwardly through ports (58, 60, 62 and 64). In other words, as seen in the top view of FIG. 4, the outer perimeter of each port (58, 60, 62 and 64), like the ports in electrolyte membrane (30), is continuous in nature, thus preventing gas flow in the direction of the plane of the interconnect.

In the embodiment shown in the drawings, seal gaskets (20, 22) not only provide sealing, they are also used to direct air and fuel from the gas flow paths into the cathode and anode sides of the fuel cell, respectively. Seal gaskets (20, 22) have the same rectangular footprint as fuel cell (16) and interconnect (18), along with the same six gas ports arranged in the same manner as in fuel cell (16) and interconnect (18). However, passageways are provided in seal gaskets (20, 22) for directing air and fuel into the cathode and anode chambers, respectively. In addition, each seal gasket (20, 22) also includes a central opening which not only communicates with two or more of the gas ports with via these passageways, but also defines the outer boundary of either the anode or cathode chamber.

Figure 7:
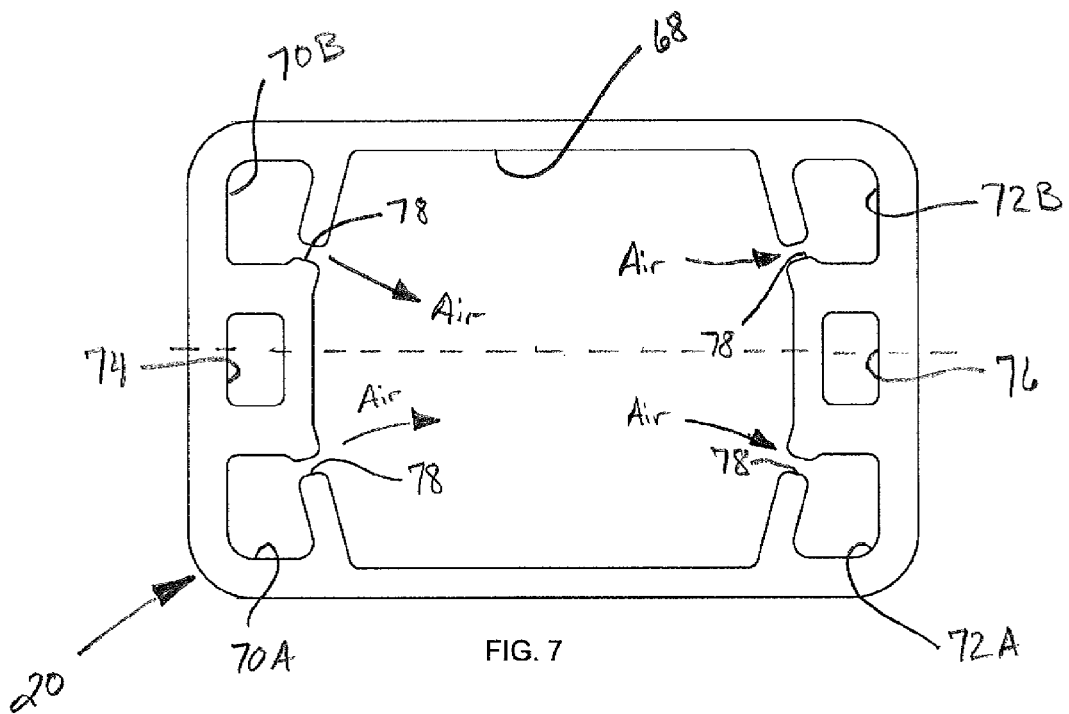
FIG. 7 is a top plan view of a cathode seal gasket of the repeat unit of FIG. 2.

FIG. 7 is a top plan view of first (or cathode) seal gasket (20) which has the same rectangular footprint as fuel cell (16) and interconnect (18). A central opening (or chamber) (68) is provided in cathode gasket (20), and has a shape corresponding to the octagonal shape of the active area of fuel cell (16). Opening (68) is also slightly larger than the active area of the fuel cell so that it extends outwardly beyond the active area of the fuel cell (16). As a result, the width of the available sealing area extending lengthwise between the lateral sides of opening (68) and the outer perimeter of gasket (20) is somewhat less than the corresponding sealing perimeter (36) of fuel cell (16) (since the fuel cell (16) and gaskets (20, 22) have the same rectangular outer footprint). When cathode gasket (20) is alignably assembled between the cathode side of fuel cell (16) and an interconnect (18) (as shown in FIG. 2), opening (68) will extend about the outer perimeter of the active area of fuel cell (16). Thus, a cathode chamber (79) (see FIG. 12) is provided between the cathode side of fuel cell (16) and the interconnect (18) located therebeneath, with the perimeter of the octagonal cathode chamber (79) defined by opening (68) in cathode gasket (20). Opening (68), as well as the similar opening (80) provided in anode gasket (22), may be sized larger than the active area of the fuel cell in order to accommodate therein current collectors which extend beyond the outer perimeter of the active area. Such an arrangement will aid in preventing fuel cell damage caused by the outer edges of the current collectors. Openings (68, 80) should also be sized to allow the current collectors to expand as their temperature increases during stack operation.

Like fuel cell (16) and interconnect (18), cathode seal gasket (20) includes six gas manifolding ports which, when repeat unit (12) is assembled, align with the six corresponding gas ports of fuel cell (16) and interconnect (18). A first pair of air manifolding ports (70A, 70B) are provided at the corners of one end of gasket (20), and a second pair of air manifolding ports (72A, 72B) are at the corners of the opposite end of gasket (20). When arranged in the manner shown in FIGS. 2 and 9, oxygen-rich air flows upwardly through ports (70A, 70B), and oxygen-depleted air (i.e., air which has traveled across the cathode side of a fuel cell) flows upwardly through ports (72A, 72B). First fuel manifolding port (74) is provided between air ports (70A, 70B), and second fuel manifolding port (76) is provided between air ports (72A, 72B) at the opposite end of gasket (20). When arranged in the manner shown in FIGS. 2 and 9, fresh (unreacted) fuel flows upwardly through second port (76), and depleted fuel (i.e., fuel which has traveled across the anode side of an underlying fuel cell) flows upwardly through first port (74).

Unlike fuel cell (16) and interconnect (18) wherein the gas ports are uninterrupted, passageways (78) extend between each of the air manifolding ports (70A, 70B, 72A, 72B) and opening (68), as shown in FIG. 7. Passageways (78) provide communication between the air ports and opening (68) such that a portion of the air flowing upwardly through first air ports (70A, 70B) is directed through passageways (78) therein, into the cathode chamber between the cathode side of fuel cell (16) and the underlying interconnect (18). This air flows across the cathode side of the cell (16), and thereafter through passageways (78) on second air ports (72A, 72B). This oxygen-depleted air thereafter flows upwardly through stack (10).

In the exemplary embodiment of FIG. 7, passageways (78) extend from ports (70, 72) to opening (68) at a location on the port which is nearest to the centerline of the seal (wherein the centerline is depicted by the dashed line in FIG. 7). With such an arrangement more air is directed toward the center of the active area of the fuel cell for cooling purposes. Of course multiple passageways may be provided between air ports (70, 72) and the cathode chamber provided by opening (68), and/or provided in alternative locations.

Figure 8:
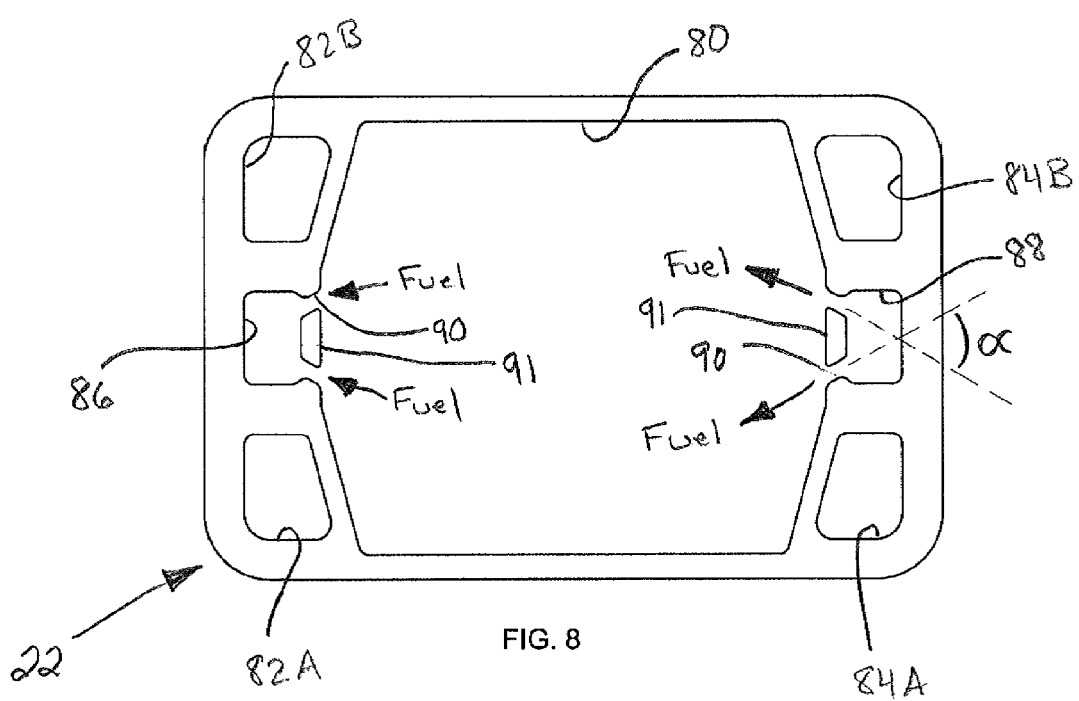
FIG. 8 is a top plan view of an anode seal gasket of the repeat unit of FIG. 2.

Second (or anode) seal gasket (22) also has the same rectangular footprint as fuel cell (16) and interconnect (18) (see top plan view of FIG. 8). Like cathode gasket (20), a central opening (or chamber) (80) is provided in anode gasket (22), and has a shape corresponding to the octagonal shape of the active area of fuel cell (16). Opening (80) is also slightly larger than the active area of the fuel cell so that it extends outwardly beyond the active area of the fuel cell (16). As a result, the width of the available sealing area extending lengthwise between the lateral sides of opening (80) and the outer perimeter of gasket (22) is somewhat less than the corresponding sealing perimeter (36) of fuel cell (16) (since the fuel cell (16) and gaskets (20, 22) have the same rectangular outer footprint). Also, opening (80) may be slightly larger than opening (68) in cathode gasket (20), as shown, in order to increase fuel retention time within the anode chamber. Alternatively, these openings (68, 80) may have the same size and shape, along with the other features on gaskets (20, 22), thus providing identical sealing geometries around the openings (68, 80) and ports (70, 82, 72, 84, 74, 86, 76, 88). In other words, the cathode and anode gaskets (20, 22) may have identical configurations apart from the locations of passageways (78, 90) and optionally their respective thicknesses and/or materials or layers.

When anode gasket (22) is alignably assembled between the anode side of fuel cell (16) and an interconnect (18) (as shown in FIG. 2), opening (80) will extend about the outer perimeter of the active area of fuel cell (16). Thus, an anode chamber (81) (see FIG. 12) is provided between the anode side of fuel cell (16) and the interconnect (18) located thereabove, with the perimeter of the octagonal cathode chamber (81) defined by opening (80) in anode gasket (22).

Like fuel cell (16) and interconnect (18), anode seal gasket (22) includes six gas manifolding ports which, when repeat unit (12) is assembled, align with the six corresponding gas ports of fuel cell (16) and interconnect (18). A first pair of air manifolding ports (82A, 82B) are provided at the corners of one end of gasket (22), and a second pair of air manifolding ports (84A, 84B) are at the corners of the opposite end of gasket (22). When arranged in the manner shown in FIGS. 2 and 9, oxygen-rich air flows upwardly through ports (82A, 82B), and oxygen-depleted air (i.e., air which has traveled across the cathode side of a fuel cell) flows upwardly through ports (84A, 84B). First fuel manifolding port (86) is provided between air ports (82A, 82B), and second fuel manifolding port (88) is provided between air ports (84A, 84B) at the opposite end of anode gasket (22). When arranged in the manner shown in FIGS. 2 and 9, fresh (unreacted) fuel flows upwardly through second port (88), and depleted fuel (i.e., fuel which has traveled across the anode side of an underlying fuel cell) flows upwardly through first port (86).

Similar to cathode gasket (20), passageways (90) extend between each of the fuel manifolding ports (86, 88)) and opening (80), as shown in FIG. 8. Passageways (90) provide communication between the fuel ports and opening (80) such that a portion of the fuel flowing upwardly through second fuel port (88) is directed through passageway (90) therein, into the anode chamber between the anode side of fuel cell (16) and the overlying interconnect (18). This fuel flows across the anode side of the cell (16), and thereafter through passageway (90) on first fuel port (86). This depleted fuel thereafter flows upwardly through stack (10).

In the embodiment shown, a flow diverter (91) is provided within passageway (90) of anode seal (22) in order to improve fuel distribution uniformity over the anode side of the fuel cell. Diverter (91) can have any of a variety of shapes and sizes, and the exemplary shape shown subdivides passageway (90) into a pair of fuel passageways whose centerlines diverge away each other at an extended angle α of less than 90 degrees (see FIG. 8). In order to facilitate stack assembly, diverter (91) may be the same material as anode seal (22), or may be formed of a different material (such as that used for interconnect (18). In addition, diverter (91) may be attached to the interconnect (18) positioned above anode gasket (22) in the stack (19), such as by resistance welding, laser welding, fusion welding, diffusion bonding, adhesive bonding or other suitable ways known to those skilled in the art. Alternatively, diverter (91) may even be integrally formed with interconnect (18).

It is often desirable that the fuel and air flows are as uniform as possible over the entire active area of each cell in the stack in order to obtain high levels of electrical efficiency in an SOFC. This may require careful design of the cells, interconnects and current collectors in the stack. One approach for accomplishing this has been to make interconnects from thick plates of an alloy material and machine grooves onto each face. However, in some applications, this approach can be prohibitively expensive, because of the large amount of alloy material that is required and the high cost of machining or acid etching to create the flow paths. The use of thick metallic interconnects also increases the weight of the stack.

In the particular embodiments described herein, the active area of fuel cell (16) has an octagonal shape such that the gas flow paths are shorter at the periphery of the cell. In other words, the length of the active area, and hence the gas flow path across the active area, is greatest along the central portion of the fuel cell (16) and decreases towards the sides of the fuel cell (16). This active area shape facilitates uniformity of fuel flow over the active cell area, without the need to expensive grooves machines into the face of the interconnect in order to provide uniform fuel flow. While gas flow channels (or paths) may still be provided in one or both faces of interconnect (18), they may be provided by inexpensive stamping or other methods of forming grooves, rather than precise machining and the like. In addition, since the shape of the active area and other mating components described herein provide for more uniform gas flow, as well as the seal gaskets used herein, the interconnects may be fabricated from inexpensive, lightweight thin foils of metallic alloys. In addition, thin-foil interconnects without stamping (i.e., flat on one or both sides) may be used, with gas flow paths built into the current collector components (as described below). Finally a combination of building gas flow paths into both interconnect and current collector components can be utilized.

Another aspect of the design of planar SOFC stacks which is often important is the pressure drop associated with flowing gases (air and fuel) through the anode and cathode sides of the cell. The pressure drops typically should be sufficient to facilitate uniform flow of reactant gases through the stack, but not so high that undue stress is applied to the seals or that excessive parasitic power is required (from the system) to deliver the air and fuel to the stack. It is also desirable in many instances that the pressure drops through the anode and cathode sides of the cells are balanced, so that seals are not compromised. Pressure drop considerations become more important when stacks are built with cells having relatively large active areas, because gas flow paths increase in length. One of the advantages of embodiments described herein is that the anode and cathode chambers provided by the first and second seal gaskets (20, 22) can be made sufficiently thick to reduce pressure drops to a desirable level. In other words, by increasing the thickness of the gaskets (20, 22) (which increases the distance between the interconnects and each side of the cell), pressure drops are reduced without having to increase the thickness of interconnect (18) and gas flow grooves machined therein. While this results in an increased thickness of the seal gaskets (20, 22), some embodiments of repeat unit (12) employ multi-layered seals and/or current collector designs which provide sufficient sealing and electrical continuity in the stack.

In order to maintain electrical continuity within the stack, cathode and anode current collectors (24, 26) may be provided between each fuel cell (16) and the adjacent interconnects (18). In the embodiment of FIG. 2, cathode current collector (24) is positioned within opening (68) of cathode gasket (20), and anode current collector (26) is positioned within opening (80) of anode gasket (22). In order to ensure electrical continuity and eliminate dead spots, current collectors (24, 26) may be somewhat thicker than the cathode and anode chambers within which they are positioned and compressible in nature such that, when compressed in the stack (10) (i.e., thicker than the seal gasket within which each current collector is positioned), the current collectors will be compressed between their respective fuel cell electrode and adjacent interconnect (18). By tailoring current collector thickness to the height of the seals, good electrical contact is provided following stack compression.

Cathode and anode current collectors are made with the same octagonal (or alternative) shape of the active cell area, and are slightly oversized (larger than their respective cathode and anode layers) in order to reduce stresses imparted to the cells during stack compression. However, since the current collectors will thermally expand during SOFC stack operation, the current collectors are typically smaller (length and width) than the openings (68, 80) in gaskets (20, 22) into which the current collectors are positioned.

In addition to being gas permeable (e.g., made from metal foam, expanded metal, etc.), one or both current collectors (24, 26) may be patterned so as to incorporate surface features on one or both surfaces for directing has flow through the respective cathode and anode chambers. Such surface features can facilitate, for example, more uniform gas flows, uniform and/or adequate pressure drops across the fuel cell, and/or increased surface area within the current collector for internal reforming reactions to occur. In some embodiments, such gas flow features may allow the elimination of gas flow channels in one or both surfaces of interconnect (18), and/or allow the use of thin interconnects with gas flow channels stamped (or otherwise formed) in one or both interconnect surfaces. In the example shown, gas flow channels are only provided in the upper (cathode-facing) surface of interconnect (18).

Each current collector (24, 26) may comprise a single layer of conductive material or two or more layers. In multi-layer current collectors, surface features for directing gas flow may be provided on one or both surfaces, of one or more of the layers. In one particular example, each current collector comprises a flat outer layers, and a patterned inner layer therebetween (as further described below).

Figure 2A:
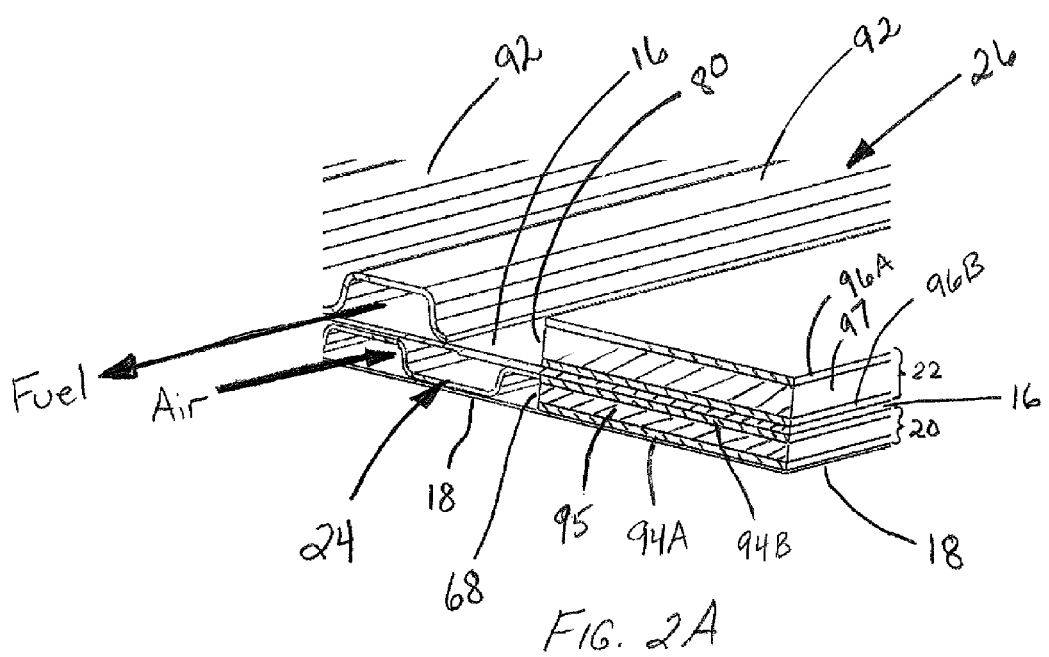
FIG. 2A is a collapsed, cross section of a portion of the repeat unit shown in FIG. 2, taken along the line 2A-2A thereof.
Figure 5A:
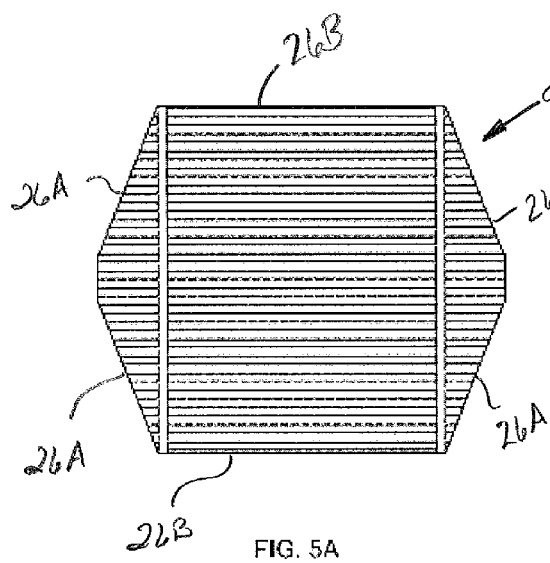
FIG. 5A is a top pan view of an anode current collector of the repeat unit of FIG. 2.
Figure 5B:
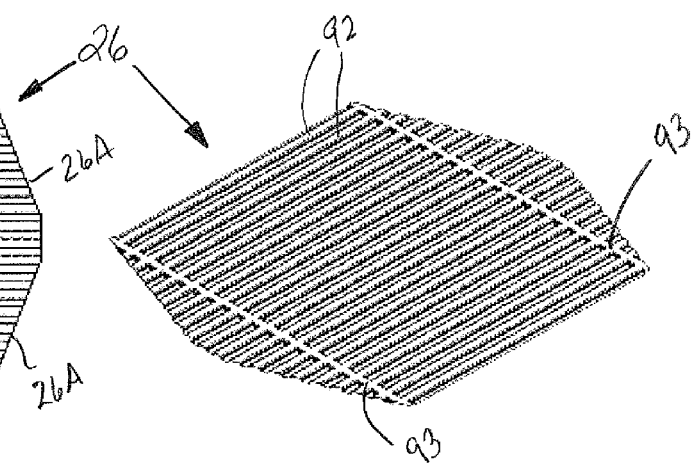
FIG. 5B is an isometric view of the anode current collector of FIG. 5A.

One embodiment of anode current collector (26) is depicted in FIGS. 2A and 5. In this embodiment, anode current collector (26) is patterned with longitudinally-extending ribs (92), with grooves extending therebetween. These ribs (92) may be formed, for example, via uniaxial pressing, and aid in directing fuel flow across the anode chamber (81) within which anode current collector (26) is positioned. One or more transverse ridges (93) may also be provided, as shown, in order to maintain flatness of the current collector and to provide better flow distribution across the face of the current collector.

Figure 6A:
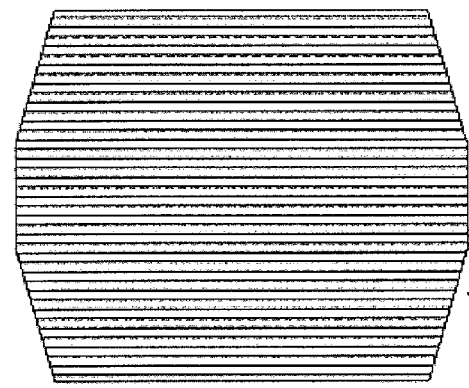
FIG. 6A is a top pan view of a cathode current collector of the repeat unit of FIG. 2.
Figure 6B:
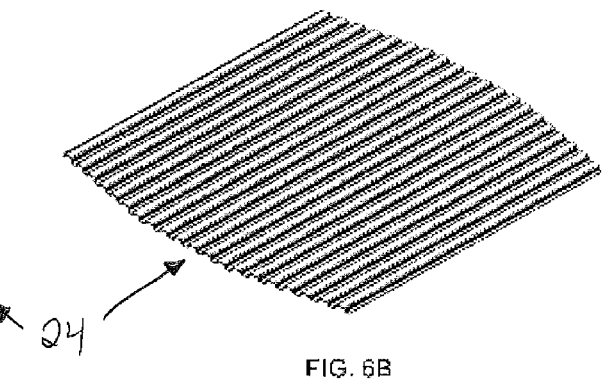
FIG. 6B is an isometric view of the cathode current collector of FIG. 5A.

Exemplary cathode current collector (24) shown in FIG. 6 is similarly patterned with alternating ribs and grooves. It will be understood that any of a variety of other shapes and configurations of surface features may be provided in one or both of the current collectors, such as the hexagonal features depicted in the inner layer of the cathode current collector of FIG. 10.

By way of specific example, for an SOFC repeat unit wherein the active area of the fuel cell is 200 cm$^2$ or less (e.g., approximately 160 cm$^2$), the anode current collector may have a height (thickness) of, for example, about 500 to 1500 microns, and the cathode current collector may have a height of, for example, about 1000 to 2000 microns. It will be understood that these heights are merely exemplary of one embodiment.

As mentioned previously, opening (80) in anode gasket (22) which defines the anode cavity (or chamber) through which fuel is flowed may be slightly larger than the opening (68) in cathode gasket (20) in order to increase fuel retention time within the anode chamber. When this is the case anode current collector (26) may be correspondingly larger than cathode current collector (24). The current collectors, since they also are used to direct gas flow may be configured in a variety of ways to influence fuel and/or air flow, such as to provide more balanced or otherwise improved fuel and/or gas flow. By way of example, angled end walls (26A) of anode current collector (26) may be extended (i.e., angle away from sidewalls (26B) at a greater angle) as compared to the configuration of cathode current collector (24). This provides additional volumes adjacent the fuel passageways (91) of anode seal (22) region within the anode cavity (or chamber), thus allowing fuel velocity to decrease before entering the active area of the anode cavity. This not only lowers the pressure drop across the cell, but also improves flow distribution throughout the entire active area.

Any of a variety of gas permeable, electrically-conductive materials may be used for cathode and anode current collectors (24, 26), including metallic foams, metallic mesh, expanded metal, and foraminous metal sheets. By way of example, anode current collector (26) may comprise metal mesh, metal foam or expanded foam made from nickel, copper, nickel-containing alloys, copper-containing alloys, or mixtures of one or more of the foregoing.

While silver mesh is commonly used for cathode current collectors (and may be used herein for cathode current collector (24)), given the relatively high cost of silver and its tendency to "sinter" in hot regions of the stack, alternative materials may be used herein. For example, cathode current collector (24) may be made from a mesh of the same types of alloys commonly used for interconnects (e.g., Crofer 22-APU, Crofer 22-H, or Haynes 441). A metal alloy mesh used for current collector (24) may also be coated in order to mitigate corrosion and concomitant volatilization of chromium containing species that can deposit on cathodes and lead to poisoning of cathode reactions. However, it will be understood that the embodiments described herein can incorporate any of a variety of anode and cathode current collector materials and forms known to those skilled in the art.

Figure 10:
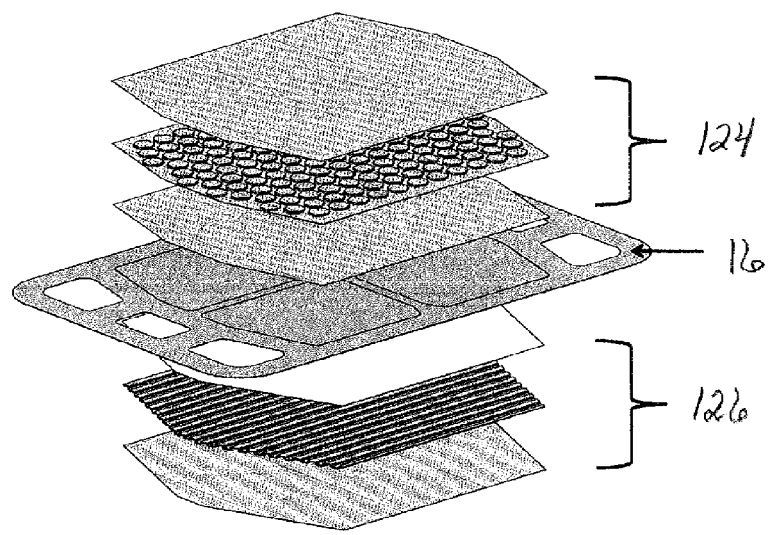
FIG. 10 is a schematic exploded view of an alternative embodiment of anode and cathode current collectors positioned on opposite sides of a fuel cell.

FIG. 10 depicts an alternative embodiment of cathode and anode current collectors (124, 126). In this embodiment, each current collector comprises three layers of gas permeable material (e.g., metal foam or mesh, expanded metal, etc.). The two outermost layers are flat, while the interior layer is textured (e.g., by pressing) in order to provide surface features therein for gas flow distribution. In the example shown, the interior layer of anode current collector (126) has longitudinal ribs and grooves similar to that shown in FIG. 5, whereas the interior layer of cathode current collector (124) has a pattern of hexagonal projections extending, for example, in the direction of fuel cell (16) (i.e., downwardly, in FIG. 10). These hexagonal projections not only aid in distributing fuel flow, but also provide stress relief for the fuel cell (16). By texturing the interior layer of the current collectors, gas flow paths are defined therein while also providing sufficient electrical continuity. It will be understood that each current collector may comprise any number of layers, one or more of which is textured or otherwise shaped to provide gas flow paths therein. In addition, various other shapes of projections besides, or in addition to, hexagons may be employed, such as circular or octagonal projections, or various combinations of projections (including ridges/ribs and grooves).

By way of example, the outer layers of the current collectors depicted in FIG. 10 may be about 100 to 250 microns thick, and the inner patterned layer about 500 to 1500 microns thick, depending on the desired or appropriate height of the anode or cathode cavity within which the current collector is positioned. If desired, the layers of the current collectors may be attached to one another in order to facilitate stack assembly, such as by welding or other means.

As discussed previously, one of the challenges associated with building planar SOFC stacks is sealing between the anode and cathode channels. In embodiments described herein employing electrolyte-supported fuel cells having dense sealing perimeters, two seals are required for each repeat unit—one between the anode face of the cell and the anode side of the interconnect (e.g., gasket (22)), and one between the cathode face of the cell and the cathode side of the interconnect (e.g., gasket (20)). Any of a variety of seal gasket materials may be used, as known to those skilled in the art, such as ceramic felts (e.g., aluminum oxide, zirconium oxide, magnesium oxide, and mixtures of two or more of the foregoing, with or without impregnated ceramic and/or glass phases), mineral gaskets (mica or vermiculite-based materials), glass (e.g., V-1176 glass), glass-ceramic composites, and various other types of materials or combinations of materials. In general, the seal gasket materials may be chosen to have thermal expansion properties similar to the materials with which they are mated in the repeat unit and stack, chemical inertness (non-reactivity, particularly with the mating materials), and sufficient density to provide a tortuous path for gas leakage.

With hermetically-bonded seals, thermal expansion differences between the various components in the stack can lead to failures during thermal cycling. One advantage of the various structures described herein, including the three (or more) layer seals described below, is that gaskets (20, 22) may be used in conjunction with compression of the stack in order to provide an effective but non-hermetic seal. The seals are not permanently bonded to the interconnect (18) and/or sealing perimeter of fuel cell (16). Rather stack compression, as well as configuration of the stack components and seal structures, provides adequate (e.g., less than about 1% of fuel or air leakage), but non-hermetic sealing. By providing adequate, but non-permanent bonding, proper sealing is maintained even during repeated thermal cycling. In contrast, hermetic seals are more prone to cracking and other stree-induced failures, particularly with repeated thermal cycling.

Some embodiments of gaskets (20, 22) are based on ceramic/glass composites, although the teachings herein may be applied to stack designs employing other types of gaskets. In one particular embodiment, one or both of gaskets (20, 22) comprise three-layer structures, as shown in FIG. 2A. Each seal gasket comprises two thin layers of an electrically-insulating sealing material (such any of the various seal gasket materials mentioned above) sandwiching a metal shim layer therebetween. The total thickness of the three-layer seal gasket is designed based on the current collector height and the desired pressure drop across the fuel cell (16). Thus, cathode gasket (20) may have a different thickness than anode gasket (22). With reference to FIG. 2A, cathode seal gasket (20) comprises first and second insulating layers (94A, 94B), and metal shim layer (95) therebetween. Similarly, anode seal gasket (22) comprises first and second insulating layers (96A, 96B), and metal shim layer (97) therebetween.

The electrically-insulating materials for insulating layers (94, 96) can be any suitable material which is both electrically-insulating and capable of sealing against the dense perimeter of fuel cell (16) and interconnect (18), such as the sealing materials mentioned above. Each of the layers, even the insulating layers within the same gasket, may be the same or different (e.g., insulating layers 96A and 96B of anode gasket (22) may be the same of different compositions). The metal shim material can be the same alloy material that is used for the interconnect, or a different alloy material. In some embodiments, the metal shim and interconnect materials have similar thermal expansion properties, as well as the other components of the repeat unit in order to minimize thermally-induced stresses. Since it is not necessary for the shim material to be chosen, in part, on the basis of conductivity, other metals which may not be suitable for interconnects may nevertheless be used for the metal shims. Examples of such materials include SR-18 and SS-430 stainless steel alloys which corrodes by forming an insulating aluminum oxide layer, and is therefore generally not suitable for forming interconnects or other components which must be conductive. If desired or necessary, coatings can be applied to the mating faces of the shims and interconnects to prevent adverse reactions between the insulating seal material and the shim or interconnect.

Suitable electrically-insulating materials for insulating sealing layers (94, 96) include, for example, ceramic felts, mineral gaskets (mica or vermiculite), glass, glass-ceramic composites, and various other types of sealing materials known to those skilled in the art. Suitable metals for shim layers (95, 97) include, for example, any of the various materials suitable for interconnects (18) (e.g., Crofer 22-APU, AL441, etc.), as well as other metals and metal alloys which are not suitable for interconnects such as SR-18 and SS-430 stainless steel alloys.

Depending on the composition, the electrically-insulating component of the seal gaskets (20, 22) can be fabricated using a variety of methods such as tape casting or roll compaction, followed by cutting to the desired size and configuration. Tape casting and roll compaction are particularly useful in manufacturing insulating gasket layers using mixtures of a polymeric binder phase and a ceramic phase with the composition of the targeted insulating material. During initial heat-up of the assembled stack, the binder(s) in the insulating layers of the gaskets will volatilize, leaving behind the desired insulating ceramic material. By incorporating a polymeric binder, at levels known or easily determined by those skilled in the art, in the initially-fabricated insulating layers of the gasket, the insulating layers of the three-layer seal gasket are extremely compliant in their as-produced (green) state, such that these layers can conform to their mating surfaces during initial compression of the assembled stack. The roll compaction method provides the additional advantage of allowing a lower organic binder content and higher relative density of the seal gasket following binder volatilization, so that there are less volatile constituents in the seal during initial stack heat-up and less shrinkage of the seal gasket as the stack reaches its operating temperature. Tape casting, on the other hand, facilitates the incorporation of compositional gradients into the insulating layers, such as by forming one or more of the insulating layers (94A, 94B, 96A, 96B) from two or more thinner layers (or sheets) of insulating material which are laminating together (e.g., via warm pressing) while still in the green state. While the various layers of the seal assemblies may be glued together (e.g., using a glue stick) at room temperature, this is generally only to facilitate stack assembly since the glue often will soften at stack operating temperatures and is not needed for purposes of stack sealing (which results from stack compression and the seal compositions).

With respect to compositional gradients in the insulating layers, this can be provided, for example, by forming each insulating layer from two or more thinner layers of differing compositions (e.g., by tape casting). By way of further example when the insulating layers are glass-ceramic composites, the insulating layers may have higher glass levels nearer the metal shim, and higher ceramic levels nearer the fuel cell. Such a compositional gradient may enhance bonding between the shim and insulating seal layer, while reducing bonding to the electrolyte membrane of the fuel cell. As yet another alternative, one or more of the insulating layers of one or both seals may have outer layers of glass-ceramic composites, sandwiching an inner glass layer in order prevent hermetic bonding between the seals and the electrolyte membrane and/or interconnect.

As alternative to tape casting or roll compaction, the electrically-insulating layers may be formed using any of a variety of other techniques. For example, insulating layers of glass, ceramic or ceramic/glass composites may be formed by spray coating, electrophoretic deposition, plasma deposition, chemical vapor deposition, sputter coating or other ways known to those skilled in the art.

One of the advantages of the three-layer seal geometry is that the insulating layers can be very thin, which makes them less prone to cracking at elevated temperatures. Thin insulating layers also provide a more tortuous leak path when cracks do occur in these layers during operation. Without the metal shim layer, a single-component seal would need to have a relatively high thickness, which makes the stack more prone to damage during thermal cycling. Furthermore, the inherent porosity of the insulating seal material, particularly when fabricated by tape casting or roll compaction, makes the use of a thick seal problematic with respect to obtaining low leak rates.

As an alternative approach, a metal shim having the same shape as one or both of the gasket (20, 22) may be incorporated into the interconnect component or otherwise provided between the interconnect and the gasket (i.e., no intervening insulating layer between the shim and the interconnect). While this approach can reduce the required thickness of the insulating seal, it also necessitates an additional, and relatively expensive, welding operation which also makes the interconnect extremely rigid. The increased rigidity of the interconnect will increase the compression force required to achieve efficient sealing, and also provides less than optimum electrical continuity in the stack (as will be shown).

In general, each of the layers of a seal gasket (20, 22) will have an identical footprint, gas port sizes and locations, gas passageway sizes and locations, central opening defining the cathode or anode chamber, etc., as shown, for example in FIGS. 7 and 8. The overall thickness of each seal gasket (20, 22) will also vary, depending on, among other things, the size of the active area of the fuel cell. In certain embodiments, each insulating layer is thinner than the metal shim layer. In still other embodiments, the combined thickness of the first and second insulating layers of the gasket is no greater than the thickness of the metal shim, or in some embodiments the combined insulating layer thickness is less than that of the metal shim layer. Seal gasket thickness will vary depending on, for example, the size of the active area of the fuel cell. In some embodiments, the insulating seal layers of the gaskets may each be about 500 microns thick or less, less than about 300 microns thick, or even less than about 200 microns thick in some embodiments. The thickness of the metal shim layer may be optimized for the particular stack design (thicker for larger active area cells).

By way of specific example, for an SOFC repeat unit wherein the active area of the fuel cell is 200 cm$^2$ or less (e.g., approximately 160 cm$^2$), the three-layer anode seal gasket may comprise two insulating layers each with thicknesses of approximately 100 to 500 microns, and a metal shim therebetween with a thickness of approximately 250 to 1500 microns. The three-layer cathode seal gasket may comprises two insulating layers each with thicknesses of approximately 100 to 500 microns, and a metal shim therebetween with a thickness of approximately 250 to 1500 microns. Since air flows through the cathode chambers of each repeat unit are, in some instances, about 1.5 to 3.5 times greater than fuel flows through the anode chambers, the cathode seal gasket will often be thicker than the anode seal gasket to provide a greater volume for the cathode chamber and reduce backpressure. For certain types of fuel, however, such as highly diluted reformate, the anode seal gasket may be thicker than the cathode seal gasket. In other embodiments, such as where a cascade fuel flow is employed (as further described herein), seal gasket thickness may vary within the stack.

When a multi-layer anode seal gasket (22) is employed, flow diverter (91) may be provided in any of a variety of ways. In one particular example wherein anode gasket (22) comprises two insulating layers and a metal shim layer therebetween, the metal shim material may be cut into the desired shape of flow diverter (91) and welded to anode (bottom) face of interconnect (18). Two layers of the insulating material of anode gasket (22) are then cut to the shape of flow diverter (91) and placed on the metal flow diverter layer that was previously welded to the anode face of the interconnect (18). Alternatively, a single layer of the insulating material having the combined thickness of the seal layers of the anode gasket (22) may be cut to the shape of the flow diverter (91) and placed on the metal flow diverter layer that was previously welded to the anode face of the interconnect (18). As yet another alternative, a three-layer flow diverter (91) may be cut from the assembled anode gasket (22) after fabrication and simply located into the appropriate location when building the stack.

In order to construct an SOFC assembly from a stack (10) of one or more repeat units (12), stack (10) is positioned between top and bottom current plates, each of which has a current bus bar (98, 99) extending therefrom, as shown in FIG. 9 (the current plates are not identified in FIG. 9). Each current plate may be configured similar to interconnect (18), including the various fuel and air ports which are aligned with the fuel and air ports of the other stack components. The top current plate is an electrical contact with the uppermost anode current collector, and the bottom current plate is in electrical contact with the lowermost cathode current collector. An upper manifold plate (28) is configured for sealing engagement with the top current plate, and a seal (e.g., similar to the seal gaskets previously described herein) is provided between the current and manifold plates. Likewise, a lower manifold plate (29) is configured for sealing engagement with the bottom current plate, and a seal is provided therebetween as known to those skilled in the art. Lower manifold plate (29) is configured for being operatively connected to sources of air and fuel, as shown in FIG. 9, such that air and fuel are delivered to the appropriate gas plenums (or flow paths) of stack (10). Similarly, upper manifold plate (28) is configured to direct oxygen-depleted air and spent fuel away from stack (10) through appropriate conduits operatively attached to upper manifold plate (28), as shown. Voltage monitor tabs (56) of interconnect plates (18) allow for voltage monitoring at any of the cells within stack (10), and current bus bars (98, 99) are used for extracting current from stack (10).

After assembly of stack (10), the stack may be placed into an insulated hot box or other heatable enclosure. Stack (10) is also compressed within the hot box or other enclosure to ensure proper sealing and electrical continuity. The hot box may include a compression means to maintain a controllable and uniform sealing force to the stack, both during steady-state operation and during transients (e.g., start-up and shut-down).

FIG. 26 depicts an alternative embodiment of a metal shim layer (220) of a three-layer cathode seal gasket similar to cathode gasket (20) described previously. The two outer, electrically-insulating layers of the cathode gasket may be configured to that depicted in FIG. 7, with metal shim layer (220) sandwiched therebetween. Shim layer (220) has generally has the same rectangular footprint as gasket (20), and includes central octagonal opening (268), first pair of air manifolding ports (270A, 270B), second pair of air manifolding ports (272A, 272B), first fuel manifolding port (274), second fuel manifolding port (276), and passageways (278), all of which have the same size, configuration and alignment as the correspondingly numbered features of cathode gasket (20). The insulating outer layers used with shim (220) are configured like that shown in FIG. 7, and therefore are solid everywhere except the gas ports, central opening and passageways extending between the air ports and the central opening. In contrast, metal shim layer (220) is hollowed in certain areas—i.e., portions of metal shim layer (220) have been removed. The resulting gasket therefore includes internal, enclosed voids (or hollow regions) which reduces the weight of the gasket. This results in reduced weight of the repeat unit (and hence reduced stack weight), as well as an increase in the sealing pressure applied to the insulating layers of the cathode gasket (since metal shim (220) is made more flexible). In the particular embodiment shown, metal shim layer (220) has a solid rectangular perimeter region (221) extending about its entire circumference, solid perimeter regions (271, 273) extending about air ports (270, 272), solid perimeter regions (275, 277) extending about fuel ports (274, 276), and solid perimeter region (269) extending about central opening (268). A plurality of support segments (279) extend between adjacent solid regions of metal shim layer (220), as shown. But, apart from the plurality of support segments (279), the areas between adjacent perimeter regions of shim layer (220) are open.

It will be understood that a three-layer anode seal gasket (22) may be configured in a manner similar to that shown in FIG. 26 to include a hollowed, lighter metal shim layer between opposing insulating layers. Either or both gaskets (20, 22) may be configured in this manner. As yet another alternative, one or both of the seal gaskets (20, 22) may be configured in the manner shown in FIG. 26 (i.e., hollowed) throughout their entire thickness, either as a single-layer gasket, or as a multi-layer gasket (including the three-layer gasket arrangement, with an inner metal shim layer). In this arrangement, the gasket is foraminous (i.e., has a plurality of openings extending therethrough, which are in addition to the gas ports and central opening). A solid perimeter region extends around the entire periphery of the gasket, as well as about the air and fuel ports, with support segments between adjacent solid regions, but the remainder of the gasket is open as shown in FIG. 26.

In the examples described above, air and fuel flow in counter-flow, but parallel, fashion through the stack. In the embodiment of FIG. 2, air enters at the bottom of the stack on one end thereof, and fuel enters at the bottom of the stack at the opposite end of the stack. Air flows across the cathode side of each repeat unit in the same direction, while fuel flows across the anode side of each repeat unit in the same direction opposite to the air flow direction. Of course the same repeat unit and stack may be used for co-flow of air and fuel. However, simply by modifying at least one of the interconnects (18), a cascade fuel flow arrangement may be provided.

Figure 30:
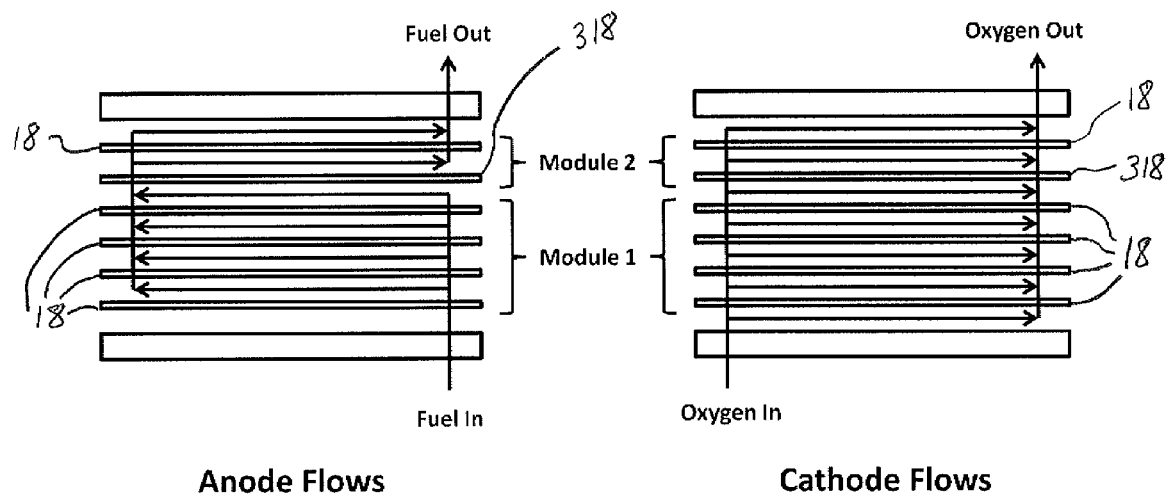
FIG. 30 is a schematic illustration of a cascade fuel cell arrangement.
Figure 31:
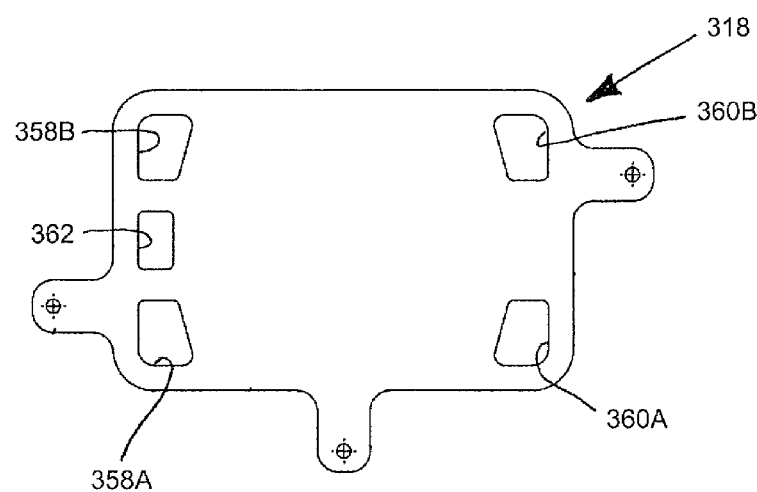
FIG. 31 depicts an interconnect used in the embodiment of FIG. 30.

FIG. 30 is a schematic illustration of a cascade fuel flow arrangement, wherein the repeat units are subdivided into two or more modules. For the sake of clarity, only the interconnects for each repeat unit are depicted. Like FIG. 2, air (oxygen, in FIG. 30) enters at the bottom of the stack and flows left to right across the cathode side of the repeat units of the first module and second modules, each of which comprises a plurality of repeat units. In general, the second module has the same or fewer repeat units than the first module, with each subsequent module having the same or fewer repeat units than the module immediately upstream (i.e., lower in the stack in the example of FIG. 30). Thus, air flows through the stack in the same manner as previously described.

For fuel flow in FIG. 30, fuel enters at the bottom of the stack and flows right to left across the anode side of the repeat units of the first module, as in FIG. 2. However, the lowermost interconnect (318) of the second module (i.e., the interconnect at the upstream end of the second module) differs from interconnect (18) in that the second fuel manifolding port is omitted such that interconnect (318) is dense (i.e., solid, with no port or other aperture) in the area between second air manifolding ports (360A, 360B). When fuel diverting interconnect (318) is positioned within one of the repeat units of the stack (i.e., at the bottom or upstream end of a module), the fuel flows upward along the right side of the stack only as far as interconnect (318). Above interconnect (318), fuel flows left to right across the anode side of the repeat units of the second module, since spent fuel escapes the stack on the right side thereof, above the second module of repeat units. Thus, in the second module of repeat units, air and fuel flow in a co-flow arrangement (parallel, and in the same direction through each repeat unit).

The cascade fuel flow arrangement depicted in FIG. 30 results in fresh, unreacted fuel flowing across the anode side of the repeat units of the first module. Thereafter, the partially-depleted fuel exiting the repeat units of the first module provides the fuel which is flowed across the anode side of the repeat units of the second module. Alternatively, or in addition thereto, cascaded air flow may also be provided by including one or more air diverting interconnects in which one set of air manifolding ports along either end of the interconnect are omitted. Typically, however, cascade flow would only be used on the fuel side.

Any number of modules, each of which having any desired number of repeat units, may be provided in the stack for a variety of cascade flow arrangements. By way of example, interconnect (318) may be simply reversed such that there is no fuel manifolding port on the left side of the interconnect. By inserting the flipped interconnect (318) into the stack, fuel flow in the module above flipped interconnect (318) is reversed again (right to left flow, in FIG. 30). Thus, a third module is provided, wherein further-depleted fuel exiting the repeat units of the second module provide the fuel for the repeat units of the third module.

In some embodiments, each subsequent module will have fewer repeat units than the immediately preceding (upstream) module. As a result, the space velocity of the fuel flowing through the second module will be increased. While this may be advantageous in some applications, it may also be desirable to decrease the flow velocity and pressures within the second or further downstream modules. This may be accomplished, for example, by increasing the thickness of anode seal gaskets (22) in the repeat units of the second (or subsequent) modules in order to increase the volume of the anode chambers.

Thus, the first and second modules of repeat units are arranged in series with respect to fuel flow therethrough. Any number of repeat units and modules may be provided in a stack, with a fuel diverting interconnect at the upstream end of each module. In some configurations, series cascaded fuel flow allows for higher utilization values for the overall stack without subjecting the individual cells to low velocity, reactant-depleted gas flows. In some instances wherein each module has fewer repeat units than the preceding module, individual fuel cells are able to generate similar power density using a 50% depleted fuel steam as the same cell on 100% fresh fuel stream because the space velocity of the depleted fuel is increased (since the same volume of reactant is fed through fewer cells in the second cascade module as in the first cascade module).

The number of cascaded modules and the number of repeat units within each module can be optimized according to the application requirements. Examples of these requirements could include: fuel type, durability, operation temperature, target efficiency, power requirements and electrical efficiency. The cells may be provided in a cascaded arrangement on either or both the fuel and air sides, and the number of cells in each subsequent cascade modules may be fewer than the number of cells of the preceding cascade module so that the space velocity of the reactant increases through the cell as the reactant becomes depleted. Gasket thicknesses may be increased in downstream modules in order to keep space velocity and pressures below acceptable levels or even to maintain the same space velocities throughout two or more modules of the stack.

As an alternative to providing fuel and/or air diverting interconnects, one of the fuel manifolding ports, or one set of the air manifolding ports, may be omitted from one or more of the gasket seals. Such an arrangement may not be as advantageous, however, since the seal gaskets may not withstand the increased pressure due to the increased flow. Also, by incorporating cascade flow diversion in an interconnect, the same anode and cathode seal gaskets (of the same or varying thickness) may be used throughout the stack.

It will also be understood that the cascade flow arrangement described above is not limited to use with electrolyte-supported fuel cells. Thus, other types of fuel cells (e.g., anode-supported fuel cells) may be used in similar arrangements, such as by employing a sealing frame structure within which the fuel cell is maintained, with the gas ports extending through this frame structure rather than the dense sealing perimeter of an electrolyte-supported fuel cell.

EXAMPLES

Multiple SOFC stacks were built and tested in order to demonstrate the salient features of the various embodiments described herein (see Table 1). In each of the examples below, unless otherwise indicated, rectangular fuel cells were fabricated as shown in FIG. 3, with a length of 222 mm and a width of 145 mm, resulting in a total area (i.e., footprint) of about 320 $cm^2$ and an active area of about 160 $cm^2$. The interconnects, anode current collectors, cathode current collectors, anode-side seals and cathode-side seals were constructed as shown in FIGS. 3-8. The interconnects and seal gaskets had the same footprint as the fuel cells (i.e., 222 mm×145 mm, for a total area of about 320 $cm^2$). The anode current collectors were similar in shape to that shown in FIG. 5, having a length of 146.42 mm and a width of 129 mm. The central opening (80) in anode gasket (22) was slightly larger than the anode current collector, and was shaped as shown in FIG. 8. The cathode current collectors were similar in shape to that shown in FIG. 6 having a length of 138.54 mm and a width of 125 mm. The central opening (68) in cathode gasket (20) was slightly larger than the cathode current collector, and was shaped as shown in FIG. 7.

The electrolyte membrane of the fuel cells was either scandium-stabilized zirconia (ScSZ) or yttrium-stabilized zirconia (YSZ), as indicated in Table 1, with a support layer (30B in FIG. 3C) thickness of 160 microns and a thin layer (30A in FIG. 3C) of 40 microns. When ScSZ was the electrolyte material, the composition was $ZrO_2$ with 6 mole percent $Sc_2O_3$ (or ScSZ-6). When YSZ was the electrolyte, the cells were made from a mixture of 70 percent of $ZrO_2$ with 3 mole percent $Y_2O_3$ (YSZ-3) and 70 percent of $ZrO_2$ with 3 mole percent $Y_2O_3$ (YSZ-3). Anode layers of Ni—Co/Ceria, 30 microns thick with an area of 160 $cm^2$ were deposited onto the support face of the electrolyte membrane (30) according to the teachings of U.S. Pub. No. 2009/0148742 A1 (published Jun. 11, 2009). Cathode layers of LSZF/GDC, 30 microns thick, were deposited onto the thin layer of the electrolyte membrane (see FIG. 3C), according to the teachings of U.S. Patent Application Number 2009/0148743 A1 (published Jun. 11, 2009).

For Examples 75, 136, 149 and 152, thin and flat (non-stamped) interconnects (18) were used. For Example 152, the interconnect was made from a 100-micron sheet of Crofer 22-APU, while in Examples 75, 136 and 149, each interconnect was made from a 200-micron sheet stock of Crofer 22-APU alloy (a high chromium content, terrific stainless steel, obtained from Theissen Krup). For Examples 101, 103, 111, 119, 122, 126, 127 and 128, the interconnects (18) were made from 240 micron sheet stock of AL441 HP alloy (a high chromium content, terrific stainless steel, obtained from Allegheny Ludlum), with the central octagonal region corresponding to the active area of the fuel cells stamped to provide gas flow channels as shown in FIG. 4. In some of the stacks, metal shims (e.g., 0.5 mm in thickness) made of the same alloy as the interconnect (18) (AL441 HP) were employed. In some instances, the metal shims were laser-welded to one face of the non-active area of the interconnect (18). Anode current collectors were made of nickel foam (obtained from Novamet Specialty Products Corporation), pressed to appropriate thickness. Cathode current collectors were made of silver mesh (Product Number 0207441, obtained from Newark Wire), and pressed to appropriate thickness. The seal gaskets were made from a variety of materials in a variety of configurations, as summarized in Table 1. Additional details are provided in the examples below.

Example #75

A 3-cell stack was built with ScSZ-based fuel cells (16) and 200 micron thick flat planar interconnects (18), without stamped flow fields and without welded shims. Seal gaskets of appropriate shapes (FIGS. 7 and 8) were made of Thermiculite (a vermiculite-based gasket material obtained from Flexitallic, Ltd.). The cathode seal gasket was 1.5 mm thick, and the anode seal gasket was 0.75 mm thick. Cathode current collectors for the stack were made of three layers of silver mesh, and anode current collectors were made from three layers of nickel foam, in an arrangement shown in FIG. 10. For each of these three-layer current collector assemblies, the exterior layers were flat and the interior layer was pressed to impart texture, this texture designed to define gas flow paths for the air and fuel. The inner layers of both the anode and cathode current collectors were stamped to provide lengthwise-extending ribs and grooves, similar to that shown in FIG. 10 for anode current collector (124). The stack was built according to the diagrams shown in FIGS. 2 and 9. The assembled stack was loaded into a stack testing furnace and heated to a temperature of 800° C. (measured as the average temperature of the top and bottom manifolds). A compression force of 73 kg was applied to the stack during testing, and the anodes were reduced with hydrogen/nitrogen gas mixtures.

The stack was tested with fuel (50% $H_2$, 50% $N_2$) flowing through anode channels and air flowing through cathode channels. The fuel and air flows were increased over time as the applied current density was increased. A plot of stack power versus time is shown in FIG. 11, with two operational points specified. In the first operational point, the fuel flow rate was 4.50 liters per minute of diluted hydrogen (50% $H_2$). the air flow rate was 16.0 liters per minute, and the current density was 0.438 A/cm$^2$. Under these conditions the stack delivered a total of 150 watts (50 watts per cell) at a potential of 0.7 volts per cell and fuel utilization of approximately 65 percent. In the second operational point, the fuel flow rate was 8.0 liters per minute of diluted hydrogen (50% $H_2$), the air flow rate was 28.5 liters per minute, and the current density was 0.55 A/cm$^2$. Under these conditions the stack delivered a total of 187 watts (62 watts per cell) at a potential of 0.7 volts per cell and fuel utilization of approximately 46 percent. This data demonstrates the feasibility of using thin foil interconnects without stamped gas flow paths by using the three-layer current collector configuration to define the gas flow paths.

Example #101

A 10-cell stack was built with ScSZ-based fuel cells (16) and 240 micron thick interconnects without welded shims. Nickel-foam anode current collectors were pressed to a height of 800 microns, with patterns as shown in FIG. 5. Silver-mesh cathode current collectors were pressed to a height of 800 microns, with patterns as shown in FIG. 6. Seal tapes (0.75 mm in thickness) were made by roll compaction from a powder mixture of 60 volume percent magnesium aluminate (obtained from Unitec Ceramics Ltd.) and 40 volume percent of a barium aluminosilicate-based glass (Product Number V-1716, obtained from VIOX Corporation). Seal gaskets were then laser-cut from the tape to the appropriate geometries (FIGS. 7 and 8). The stack was built according to the diagrams shown in FIGS. 2 and 9, with the sealing configuration shown in FIG. 12 (single layer cathode and anode seal gaskets (20, 22). Voltage leads were attached to each interconnect in the stack, which allowed the performance of individual cells to be assessed. The stack was loaded into a stack testing furnace and heated to a temperature of 800° C. (measured as the average temperature of the top and bottom manifolds). A compression force of 34 kg was applied to the stack during testing. The anodes were reduced with hydrogen/nitrogen gas mixtures, and a pole curve was obtained with 14 liters per minute of diluted hydrogen (50% $H_2$ in $N_2$) flowing through the anode channels and 42 liters per minute of air flowing through the cathode channels of the stack. The cathode air was heated to approximately 700° C. before it entered the stack. Stack voltage was recorded with increasing current levels until the lowest performing cell in the stack had a potential of 0.70 volts or lower. The pole curve thus obtained is presented in FIGS. 13 and 14.

Overall, this stack performed well, with 500 watts of power (50 watts per cell) achieved at a high average potential (0.75 volts per cell) and high fuel utilization (70 percent). However, there was some evidence of fuel starvation when fuel utilization exceeded 55 to 60 percent, based on the non-linearity of the pole curve at high current density (see FIG. 13). Upon disassembly of the stack it was noted that several of the seals were cracked, which explains the non optimum fuel utilization observed in the stack. Thus, it can be concluded that the ceramic/glass composite seals are relatively effective, but there may be a tendency for cracking when the single-layer, glass-based seals are too thick.

Example #103

A 10-cell stack was built with ScSZ-based fuel cells (16) and 240 micron thick interconnects (18) with a 0.5 mm thick metal shim laser-welded to the cathode side of each interconnect. The metal shims had the same configuration as the cathode side gasket (see FIG. 7). Nickel-foam anode current collectors were pressed to a height of 800 microns, with patterns as shown in FIG. 5. Silver-mesh cathode current collectors were pressed to a height of 1200 microns, with patterns as shown in FIG. 6. The same 0.75-mm thick composite seal gaskets (60 volume percent of magnesium aluminate and 40 volume percent of V-1716 glass) described for Example #101 were used. The stack was built according to the diagram shown in FIGS. 2 and 9, with the sealing configuration shown in FIG. 15. The stack was tested at 800° C. as described for Example #101. A pole curve obtained with 14 liters per minute of diluted hydrogen (50% $H_2$ in $N_2$) flowing through the anode channels and 42 liters per minute of heated air flowing through the cathode channels is presented in FIG. 16. The performance of this stack was not as good as that of Example #101, since it was only able to provide 433 watts and 56 percent fuel utilization at the point where one of the cells in the stack dropped below 0.7 volts. Thus, it can be concluded that welding of a metal shim to the cathode face of the interconnect is not an optimal approach.

Example #111

A 10-cell stack was built with ScSZ-based fuel cells (16) and 240 micron thick interconnects (18) having a 0.5 mm thick metal shim laser-welded to the anode side of each interconnect. Nickel-foam anode current collectors were pressed to a height of 1200 microns, with patterns as shown in FIG. 5. Silver-mesh cathode current collectors were pressed to a height of 800 microns, with patterns as shown in FIG. 6. Seal gaskets (each 100 microns thick) were made by tape casting 50 micron thick green sheets of V-1716 glass, laminating two such sheets by warm pressing, and laser cutting the laminated sheets to the appropriate geometry. This stack was built with a sandwich seal gasket (20) on the cathode side (i.e., two 100-micron thick seal gaskets sandwiching a 1-mm thick metal shim). The metal shim in the cathode-side sandwich seal had the exact same geometry as the cathode seal, as was shown previously in FIG. 7. On the anode side, the seal gasket (22) was a single layer (100 microns thick), configured as shown in FIG. 8.

The stack was built according to the diagrams shown in FIGS. 2 and 9, with the sealing configuration shown in FIG. 17. The stack was tested at 800° C. as described for Example #101. A pole curve obtained with 14 liters per minute of diluted hydrogen (50% $H_2$ in $N_2$) flowing through the anode channels and 42 liters per minute of heated air flowing through the cathode channels is presented in FIG. 18. The performance of this stack was not as good as that of Example #101, since it was only able to provide 281 watts at 38 percent fuel utilization at the point where one of the cells in the stack dropped below 0.7 volts. Thus, it can be concluded that welding of a metal shim to the anode face of the interconnect is not an optimal approach.

Example #119

A three-cell stack was built with YSZ-based fuel cells (16) and 240 micron thick interconnects (18), without welded shims. Nickel-foam anode current collectors were pressed to a height of 1200 microns, with patterns as shown in FIG. 5. Silver-mesh cathode current collectors were pressed to a height of 1600 microns, with patterns as shown in FIG. 6.

In this example, the seal gaskets (20, 22) were configured as shown in FIG. 2C, with a metal shim layer sandwiched between two electrically-insulating layers. In this case, however, each of the insulating layers were themselves three-layer laminates having a thickness of 250 microns. The insulating layers for each seal gasket (20, 22) were made from a three-layer lamination of 85 micron thick, tape cast green sheets of two compositions: (1) pure V-1716 glass and; (2) a composite of 60 volume percent of $Al_2O_3$ and 40 volume percent of V-1716 glass. The insulating layers for each gasket were made by laminating three tape layers—single layers of composite $Al_2O_3$/V-1716 tapes on the exterior and a single V-1716 glass tape layer in the middle), and then laser cutting the laminated sheets to the appropriate geometry.

The stack was built with sandwich seals on both the cathode side (two 250-micron thick, composite insulating layers, sandwiching a 1-mm thick metal shim) and anode side (two 250 micron thick, composite insulating layers, sandwiching a 0.5-mm thick metal shim). The metal shim in the cathode-side sandwich seal had the exact same geometry as the cathode seal, as was shown previously in FIG. 7. The metal shim in the anode-side sandwich seal had the exact same geometry as the anode seal, as was shown previously in FIG. 8. The stack was built according to the diagrams shown in FIGS. 2 and 9, with the sealing configuration shown in FIG. 19.

The stack was tested at 800° C. as described under Example #101, except that lower fuel and air flow rates were used and unheated air was delivered to the stack. A pole curve obtained with 4.2 liters per minute of diluted hydrogen (50% $H_2$ in $N_2$) flowing through the anode channels and 12.6 liters per minute of air flowing through the cathode channels is presented in FIG. 20. This stack performed well, delivering almost 50 watts per cell at 68 percent fuel utilization, without evidence of fuel starvation. Thus, it can be concluded that the ceramic/glass composite seal material made by tape casting and used in conjunction with the sandwich seal approach has advantages for operating stacks at high power density and high fuel utilization.

Example #122

A ten-cell stack was built with YSZ-based fuel cells (16) and 240 micron thick interconnects (18) without welded shims, with the exact same repeat units as described in Example #119. The stack was tested at 800° C. as described under Example #101. A pole curve obtained with 14 liters per minute of diluted hydrogen (50% $H_2$ in $N_2$) flowing through the anode channels and 30 liters per minute of heated air flowing through the cathode channels is presented in FIG. 21. This stack also performed well, delivering more than 50 watts per cell at 70 percent fuel utilization, without evidence of fuel starvation. Thus, it can be concluded that the ceramic/glass composite seal material made by tape casting and used in conjunction with the sandwich seal approach retained its advantages when the number of cells in the stack increased.

Example #126

A 3-cell stack was built with YSZ-based fuel cells (16) and 240 micron thick interconnects (18) without welded shims. Nickel-foam anode current collectors were pressed to a height of 200 microns, with patterns as shown in FIG. 5. Silver-mesh cathode current collectors were pressed to a height of 1600 microns, with patterns as shown in FIG. 6. Seal gaskets (250 microns in thickness) were made by roll compaction of a powder mixture of 60 volume percent of $Al_2O_3$ and 40 volume percent of V-1716 glass. Seal gaskets were made from these roll-compacted tapes by laser cutting to appropriate geometries. The stack was built according to the diagrams shown in FIGS. 2 and 9, with sandwich seals on both the cathode and anode sides according to the sealing configuration shown in FIG. 19. The stack was tested at 800° C. as described under Example #119. A pole curve obtained with 4.2 liters per minute of diluted hydrogen (50% $H_2$ in $N_2$) flowing through the anode channels and 12.6 liters per minute of unheated air flowing through the cathode channels is presented in FIG. 22. The performance of this stack was essentially the same as that of Example #119, achieving 146 watts at 70 percent fuel utilization, without evidence of fuel starvation at high current density. Thus, it can be concluded that the ceramic/glass composite seal material made by roll compaction used in conjunction with the sandwich seal approach has advantages for operating stacks at high power density and high fuel utilization.

Example #127

This 15-cell stack was built with YSZ-based fuel cells (16) and 240 micron thick interconnects (18) without welded shims, with the exact same repeat units as described under Example #126. The stack was tested at 800° C. as described for Example #101, except for higher air and fuel flows to account for the larger number of cells. A pole curve obtained with 21 liters per minute of diluted hydrogen (50% H2 in N2) flowing through the anode channels and 84 liters per minute of air flowing through the cathode channels is presented in FIG. 23. This stack was able to achieve almost 690 watts of power at 0.73 volts per cell and 63 percent fuel utilization, without evidence of fuel starvation. Thus, it can be concluded that the ceramic/glass composite seal material made by roll compaction used in conjunction with the sandwich seal approach retained its advantages when the number of cells in the stack was increased.

Example #128

A 24-cell stack was built with YSZ-based fuel cells (16) and 240 micron thick interconnects (18) without welded shims, with the exact same repeat units as described in Examples #126 and #127. The stack was tested at 800° C. as described for Example #101, except that higher fuel and air flow rates were used and that the diluted hydrogen fuel was heated to approximately 600° C. before being delivered to the stack. A pole curve obtained with 33.6 liters per minute of diluted hydrogen (50% $H_2$ in $N_2$) flowing through the anode channels and 130 liters per minute of air flowing through the cathode channels is presented in FIG. 24. This stack was able to achieve more than 1.1 kW of power at 0.78 volts per cell and 60 percent fuel utilization, without evidence of fuel starvation. The same stack was tested with lower fuel and air flow rates (26.8 liters per minute of fuel and 112 liters per minute of air) and approximately 1 kW of power was achieved at 0.75 volts per cell and 70 percent fuel utilization (see FIG. 25). Thus, it can be concluded that the ceramic/glass composite seal material made by roll compaction and used in conjunction with the sandwich seal approach retained its advantages when the number of cells in the stack was further increased.

Example #136

A 3-cell stack was built with YSZ-based fuel cells (16) and 200 micron thick interconnects (18), without stamped flow fields, and with the exact same repeat units as described in Examples #126, #127, and #128. The stack was tested at 800° C. as described for Example #126. A pole curve obtained with 4.2 liters per minute of diluted hydrogen (50% $H_2$ in $N_2$) flowing through the anode channels and 15.0 liters per minute of unheated air flowing through the cathode channels is presented in FIG. 27. The performance of this stack was essentially the same as that of Example #119, achieving 146 watts at 70 percent fuel utilization, without evidence of fuel starvation at high current density (see FIG. 27). Thus, it can be concluded that the flat interconnect has equivalent performance for operating stacks at high power density and high fuel utilization.

Example #149

A ten-cell stack was built with YSZ-based fuel cells (16) and 200 micron thick flat interconnects (18) without welded shims, with the exact same repeat units as described in Example #119 except that the cells had an active area of 300 $cm^2$. The stack was tested at 800° C. as described under Example #101. A pole curve obtained with 26.2 liters per minute of diluted hydrogen (50% $H_2$ in $N_2$) flowing through the anode channels and 120 liters per minute of heated air flowing through the cathode channels is presented in FIG. 28. This stack also performed well, delivering more than 100 watts per cell at 70 percent fuel utilization, without evidence of fuel starvation. Thus, it can be concluded that the ceramic/glass composite seal material made by tape casting and used in conjunction with the sandwich seal approach retained its advantages when the size of the cell in the stack increased.

Example #152

A 3-cell stack was built with YSZ-based fuel cells (16) and 100 micron thick interconnects (18) without welded shims, with the exact same repeat units as described in Examples #126, #127, and #128 except for the anode shim was the hollowed out design of FIG. 26. The stack was tested at 800° C. as described for Example #126. A pole curve obtained with 4.2 liters per minute of diluted hydrogen (50% H2 in N2) flowing through the anode channels and 15.0 liters per minute of unheated air flowing through the cathode channels is presented in FIG. 29. The performance of this stack was essentially the same as that of Example #119, achieving 147 watts at 70 percent fuel utilization, without evidence of fuel starvation at high current density. Thus, it can be concluded that the ceramic/glass composite seal material used in conjunction with the hollowed out shim seal material has equivalent performance for operating stacks at high power density and high fuel utilization while lowering the weight of the system.

TABLE 1

Details of Example Stacks

| Example | Electrolyte Material | Number of Cells | Cathode Side Seal | Anode Side Seal | Seal Material |
|---|---|---|---|---|---|
| 75 | ScSZ | 3 | 1.5 mm seal | 0.75 mm seal | Thermiculite (A) |
| 101 | ScSZ | 10 | 0.75 mm seal | 0.75 mm seal | Single layer made by roll compaction (B) |
| 103 | ScSZ | 10 | 0.50 mm shim welded to IC, 0.75-mm seal | 0.75 mm seal | Single layer made by roll compaction (b) |
| 111 | ScSZ | 10 | 100 μm seal 1.0 mm shim 100 μm seal | 0.50 mm shim welded to IC, 100 μm seal | Single layer made by tape casting (C) |

TABLE 1-continued

Details of Example Stacks

| Example | Electrolyte Material | Number of Cells | Cathode Side Seal | Anode Side Seal | Seal Material |
|---|---|---|---|---|---|
| 119 | YSZ | 3 | 0.25 mm seal<br>1.0 mm shim<br>0.25 mm seal | 0.25 mm seal<br>0.50 mm shim<br>0.25 mm seal | Three-layer laminate made by tape casting (D) |
| 122 | YSZ | 10 | 0.25 mm seal<br>1.0 mm shim<br>0.25 mm seal | 0.25 mm seal<br>0.50 mm shim<br>0.25 mm seal | Three-layer laminate made by tape casting (D) |
| 126 | YSZ | 3 | 0.25 mm seal<br>1.0 mm shim<br>0.25 mm seal | 0.25 mm seal<br>0.50 mm shim<br>0.25 mm seal | Single layer made by roll compaction (E) |
| 127 | YSZ | 15 | 0.25 mm seal<br>1.0 mm shim<br>0.25 mm seal | 0.25 mm seal<br>0.50 mm shim<br>0.25 mm seal | Single layer made by roll compaction (E) |
| 128 | YSZ | 24 | 0.25 mm seal<br>1.0 mm shim<br>0.25 mm seal | 0.25 mm seal<br>0.50 mm shim<br>0.25 mm seal | Single layer made by roll compaction (E) |
| 136 | YSZ | 3 | 0.25 mm seal<br>1.0 mm shim<br>0.25 mm seal | 0.25 mm seal<br>0.50 mm shim<br>0.25 mm seal | Single layer made by roll compaction (E) |
| 149 | YSZ | 10 | 0.25 mm seal<br>1.0 mm shim<br>0.25 mm seal | 0.25 mm seal<br>0.50 mm shim<br>0.25 mm seal | Three-layer laminate made by tape casting (D) |
| 152 | YSZ | 3 | 0.25 mm seal<br>1.0 mm shim<br>0.25 mm seal | 0.25 mm seal<br>0.50 mm shim<br>0.25 mm seal | Single layer made by roll compaction (E) |

Seal Compositions
(A) Vermiculite
(B) Mixture of magnesium aluminate (60 vol %) and V-1716 glass (40 vol %)
(C) V-1176 glass
(D) 50 μm of $Al_2O_3$/V-1176 (60/40 vol %) on outside, 150 μm of V-1176 glass in middle
(E) Mixture of aluminum oxide (60 vol %) and V-1716 glass (40 vol %)

While several devices and components thereof have been discussed in detail above, it should be understood that the components, features, configurations, and methods of using the devices discussed are not limited to the contexts provided above. In particular, components, features, configurations, and methods of use described in the context of one of the devices may be incorporated into any of the other devices. Furthermore, not limited to the further description provided below, additional and alternative suitable components, features, configurations, and methods of using the devices, as well as various ways in which the teachings herein may be combined and interchanged, will be apparent to those of ordinary skill in the art in view of the teachings herein.

Having shown and described various versions in the present disclosure, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A repeat unit for a fuel cell stack comprising:
(a) a conductive interconnect plate;
(b) an electrolyte-supported fuel cell comprising an electrolyte membrane having a dense sealing perimeter, an anode on one side of the membrane, and a cathode on the opposite side of the membrane, wherein said dense sealing perimeter extends around the entire perimeter of the fuel cell;
(c) a cathode gasket adjacent the cathode side of the fuel cell, sealingly engaged between the dense sealing perimeter of the fuel cell and the interconnect, the cathode gasket having a central opening therein which is aligned with, and extends about, the cathode of the fuel cell; and
(d) an anode gasket adjacent the anode side of the fuel cell, sealingly engageable between the dense sealing perimeter of the fuel cell and an interconnect of another repeat unit, the anode gasket having a central opening therein which is aligned with, and extends about, the anode of the fuel cell;
wherein first and second air manifolding ports, and first and second fuel manifolding ports are provided in each of the interconnect plate, dense sealing perimeter of the electrolyte membrane, cathode gasket and anode gasket components, each of said ports on the components aligned with corresponding ports on the other components such that the aligned ports together provide first and second air plenums and first and second fuel plenums;
further wherein at least one passageway extends between each of the air ports of said cathode gasket and the central opening of the cathode gasket so as to provide fluid communication between the air ports and the central opening of the cathode gasket; and
wherein at least one passageway extends between each of the fuel ports of said anode gasket and the central opening of the anode gasket so as to provide fluid communication between the fuel ports and the central opening of the anode gasket.

2. The repeat unit of claim 1, further comprising a cathode current collector located within the central opening of the cathode gasket and in electrical contact with the cathode of the fuel cell and the interconnect.

3. The repeat unit of claim 2, further comprising an anode current collector located within the central opening of the anode gasket and in electrical contact with the anode of the fuel cell, the anode current collector configured for making electrical contact with the interconnect of an another repeat unit.

4. The repeat unit of claim 1, wherein said interconnect comprises a metal foil between about 50 and about 1000 microns thick, and further wherein said foil interconnect has gas flow channels formed in at least a portion thereof.

5. The repeat unit of claim 1, wherein a pair of first air manifolding ports are provided at one end of each of the interconnect plate, dense sealing perimeter of the fuel cell, cathode gasket and anode gasket, and a pair of second air manifolding ports are provided at an opposite end of each of the interconnect plate, dense sealing perimeter of the fuel cell, cathode gasket and anode gasket, and further wherein the ports, when aligned, a pair of first air plenums at one end of the repeat unit, and a pair of second air plenums are provided at an opposite end of the repeat unit.

6. The repeat unit of claim 5, wherein the first fuel manifolding port is located between the first air manifolding ports, and the second fuel manifolding port is located between the second pair of air manifolding ports, on each of the interconnect plate, dense sealing perimeter of the fuel cell, cathode gasket and anode gasket.

7. The repeat unit of claim 6, further comprising a cathode current collector located within the central opening of the cathode gasket in electrical contact with the cathode of the fuel cell and the interconnect, and an anode current collector located within the central opening of the anode gasket in electrical contact with the anode of the fuel cell, the anode current collector configured for making electrical contact with the interconnect of an another repeat unit.

8. The repeat unit of claim 7, wherein at least one of the current collectors has at least one textured surface for directing air or fuel flow through the central opening in which the current collector is positioned.

9. The repeat unit of claim 3, wherein at least one of the current collectors comprises first and second flat, gas permeable, sheets, and a textured sheet located between said first and second flat sheets.

10. The repeat unit of claim 1, wherein at least one of said anode and cathode gaskets comprises an interior metal shim layer, located between outer electrically-insulating layers.

11. The repeat unit of claim 10, wherein said outer insulating layers comprise glass, or a glass-ceramic composite material.

12. The repeat unit of claim 11, wherein both of said anode and cathode gaskets comprises an interior metal shim layer, located between outer electrically-insulating layers, and further wherein said outer insulating layers comprise glass, or a glass-ceramic composite material.

13. The repeat unit of claim 10, wherein at least a portion of the gasket having the metal shim is internally hollow.

14. The repeat unit of claim 1, wherein at least one of said gaskets is foraminous.

15. An SOFC stack comprising an aligned stack of a plurality of the repeat units of claim 1.

16. An SOFC stack configured for cascade fuel flow therethrough, the stack including a first module comprising an aligned stack of a plurality of repeat units, and a second module comprising an aligned stack of a plurality of repeat units, each of said repeat units comprising:
    (a) a conductive interconnect plate having first and second air manifolding ports, and first and second fuel manifolding ports;
    (b) an electrolyte-supported fuel cell comprising an electrolyte membrane having a dense sealing perimeter, an anode on one side of the membrane, and a cathode on the opposite side of the membrane, wherein said dense sealing perimeter includes first and second air manifolding ports and first and second fuel manifolding ports, each of said ports aligned with corresponding ports on the interconnect;
    (c) a cathode gasket sealingly positioned between the cathode side of the fuel cell and the interconnect, the cathode gasket having first and second air manifolding ports, and first and second fuel manifolding ports, each of said ports aligned with corresponding ports on the interconnect; and
    (d) an anode gasket sealingly positioned between the anode side of the fuel cell and the interconnect of an adjacent repeat unit, the anode gasket having first and second air manifolding ports, and first and second fuel manifolding ports, each of said ports aligned with corresponding ports on the cathode gasket and on the interconnect of an adjacent repeat unit;
    wherein the interconnect of the second module which is located adjacent the first module, has only one fuel manifolding port, such that, during operation, fuel which has flowed across the anode side of the fuel cells of the first module provides the fuel which is supplied to the fuel cells of the second module.

* * * * *